United States Patent
Winkler et al.

(10) Patent No.: US 12,454,494 B2
(45) Date of Patent: Oct. 28, 2025

(54) PROCESS FOR THE REDUCTION OF GAS EMISSION FROM FARM MANURE

(71) Applicant: Alzchem Trostberg GmbH, Trostberg (DE)

(72) Inventors: Stephan Winkler, Altenmarkt (DE); Martin Eberl, Niederbergkirchen (DE); Susanne Erl, Tacherting (DE); Jürgen Sans, Trostberg (DE); Jürgen Bezler, Burghausen (DE)

(73) Assignee: Alzchem Trostberg GmbH, Trostberg (DE)

( * ) Notice: Subject to any disclaimer, the term of this patent is extended or adjusted under 35 U.S.C. 154(b) by 1196 days.

(21) Appl. No.: 17/292,971

(22) PCT Filed: Nov. 11, 2019

(86) PCT No.: PCT/EP2019/080869
§ 371 (c)(1),
(2) Date: May 11, 2021

(87) PCT Pub. No.: WO2020/099321
PCT Pub. Date: May 22, 2020

(65) Prior Publication Data
US 2022/0002212 A1    Jan. 6, 2022

(30) Foreign Application Priority Data
Nov. 12, 2018 (DE) .................... 10 2018 128 173.0

(51) Int. Cl.
C05F 3/00 (2006.01)

(52) U.S. Cl.
CPC .................................... *C05F 3/00* (2013.01)

(58) Field of Classification Search
CPC ........................................................ C05F 3/00
See application file for complete search history.

(56) References Cited

U.S. PATENT DOCUMENTS

| 10,189,751 B2 | 1/2019 | Hartmann |
| 2002/0121117 A1 | 9/2002 | Hartmann et al. |
| 2004/0016275 A1 | 1/2004 | Hartmann et al. |

(Continued)

FOREIGN PATENT DOCUMENTS

| CN | 103570392 A | 2/2014 |
| CN | 104671923 A | 6/2015 |
| CN | 106995318 A | 8/2017 |

(Continued)

OTHER PUBLICATIONS

German Application No. 102018128173.0, German Search Report mailed Sep. 30, 2019, 9 pages.

(Continued)

*Primary Examiner* — Wayne A Langel
(74) *Attorney, Agent, or Firm* — Kilpatrick Townsend & Stockton LLP

(57) ABSTRACT

The present invention relates to a method and a use of a composition, in each case for reducing the emission of environmentally harmful climate gases methane and/or carbon dioxide from farm manures during its storage. In some examples, the method and use involves bringing a composition comprising calcium cyanamide into contact with the farm manure.

12 Claims, 5 Drawing Sheets

(56) References Cited

U.S. PATENT DOCUMENTS

2006/0010712 A1  1/2006  Carin et al.
2014/0311200 A1  10/2014  Hartmann

FOREIGN PATENT DOCUMENTS

| | | | |
|---|---|---|---|
| CN | 107434750 | A | 12/2017 |
| JP | 2000109917 | A | 4/2000 |
| JP | 2003519065 | A | 6/2003 |
| JP | 2005295807 | A | 10/2005 |
| JP | 2008509871 | A | 4/2008 |
| JP | 2015506894 | | 3/2015 |
| RU | 2406714 | C2 | 12/2010 |
| WO | 0142170 | A1 | 6/2001 |
| WO | 2006020253 | A1 | 2/2006 |
| WO | 2013082485 | A2 | 6/2013 |
| WO | WO-2017165482 | A1 * | 9/2017 ............... A01C 7/06 |

OTHER PUBLICATIONS

International Application No. PCT/EP2019/080869 International Search Report and Written Opinion, Mar. 16, 2020, 12 pages.

Sajeev et al., "Greenhouse Gas and Ammonia Emissions From Different Stages of Liquid Manure Management Chains: Abatement Options and Emission Interactions", Journal of Environmental Quality, vol. 47, No. 1, Jan. 2018, pp. 30-41.

"Japanese Publication Describing Technical Development of Calcium Cyanamide", Japan Calcium Cyanamide Industry Association, 136 pages.

Chinese Application No. 201980074533.5, Chinese Office Action mailed Jan. 5, 2022, 9 pages.

Sun et al., "Stratified Microbial Structure and Activity in Sulfide- and Methane-Producing Anaerobic Sewer Biofilms", Advanced Water Management Centre, Applied and Environmental Microbiology, vol. 80, No. 22, Nov. 2014, pp. 7042-7052.

Sun et al., "Modelling the long-term effect of wastewater compositions on maximum sulfide and methane production rates of sewer biofilm", Water Research 129, 2018, pp. 58-65.

* cited by examiner

PROCESS FOR THE REDUCTION OF GAS EMISSION FROM FARM MANURE

The present invention relates to a process for reducing the emission of environmentally harmful climate gases methane and carbon dioxide from farm manures (or farm fertilizers) during their storage. Furthermore, the present invention relates to the use of a composition which suppresses or reduces the emission of environmentally harmful climate gases methane and carbon dioxide from farm manures during their storage.

In the Federal Republic of Germany, farm manures are considered to be fertilizers that are subject to legal requirements and standards. In particular, the Fertilizing Act, the Fertilizing Regulation and the Fertilizer Regulation as well as EU guidelines in their respective current versions must be complied with in the use and application as well as in the marketing of farm manures.

For example, the current Fertilizing Regulation regulates the application rate and application time of farm manures. Accordingly, farm manures may not be applied to agricultural areas within restricted periods, which, depending on the type of soil and the crop, apply for several months of the year. As a result, livestock-keeping farms are required to provide sufficient storage space for liquid manure, dung water, slurry, solid manure and the like. According to the current legal situation, storage of farm manures for at least 150 days is absolutely necessary.

US 2002/0121117 A1 as well as US 2014/0311200 A1 describe the use of calcium cyanamide compositions to reduce the exit of unpleasant smells from liquid manure. Such unpleasant smells are caused, for example, by sulfur-containing compounds or by ammonia.

Liquid manure, dung water, slurry, stable manure and the like have always been of great importance for agriculture as farm manure. However, due to the concentration of animal agriculture in a limited space, especially in the case of animal housing, these farm manures accumulate in an increased and concentrated form.

The storage of these farm manures is also associated with a variety of unresolved problems. For example, during the storage of farm manures, due to aerobic and anaerobic fermentation processes and microbial degradation of the organic substances in the farm manures environmentally harmful climate gases such as methane ($CH_4$) or carbon dioxide ($CO_2$) are produced.

For example, in 2016, around 59% of the total methane emissions in Germany came from agriculture. This year, the farm manure management (storage and application of liquid and solid manure) represented 19.2% of the total methane emissions from German agriculture. The largest amount of methane from farm manure comes from the faeces of cattle—and to a lesser extent pigs. In contrast, the other animal groups (for example, poultry, donkeys, horses) are negligible (https://www.umweltbundesamt.de/daten/land-forstwirtschaft/beitrag-der-landwirtschaft-zu-den-treibhausgas#textpart-1).

An analogous behavior with regard to the emission of climate-damaging gases can be observed in the storage of fermentation residues taken from biogas production plants. These fermentation residues, which are also used as farm fertilizers, also emit climate-damaging gases during open storage.

In the past, there has been no lack of experiments to handle these problems. For example, a number of solutions have already been found that make it possible to reduce emissions of climate-damaging gases from farm manures.

The possibilities for reducing emissions are diverse and are effective in different areas of agricultural production. Without making claims of being complete, the following measures can be mentioned here:

Measures in the barn, for example exhaust air purification, low-emission open barns, hygiene improvement.

Covering the liquid manure in the tanks with straw chopper, granules or floating films.

Use of low-emission techniques in the application of farm manures, such as direct incorporation of farm manure into the soil.

Separation of farm manure into solid and liquid phases to improve transportability.

Modern and adapted feeding strategies through low-protein multiphase feeding.

The emission of harmful gases into the environment during the storage of farm manure can be successfully enabled by closed storage containers, collection of the gases produced and further processing or disposal of the gases. However, the equipment required for this is associated with considerable costs.

The present invention is therefore based on the problem of providing a process for reducing the gas emission of methane and/or carbon dioxide from farm manure during its storage, which process can be used economically and, moreover, does not impair the planned use of the farm manure as a fertilizer for agriculture.

This problem is solved by a process according to claim 1 and uses according to claims 9 and 10. Preferred embodiments of the invention are given in the dependent claims.

Thus, according to a first embodiment, a process for reducing the emission of methane ($CH_4$) and/or carbon dioxide ($CO_2$) from farm manure during its storage is subject matter of the present invention, comprising the following process steps:

a) Providing a storage tank for the farm manure having a volume X, and b) Filling the storage tank with the farm manure in an amount of at least 5% by volume of the volume X of the storage tank; and c) Adding a composition comprising calcium cyanamide (CaNCN) to the storage tank and contacting the composition with the farm manure.

It is essential here that calcium cyanamide and not cyanamide is used. Calcium cyanamide (CaNCN, CAS [156-62-7]), the calcium salt of cyanamide ($CH_2N_2$, CAS [420-04-2]), has been known for some time as a component and active ingredient of fertilizers. For example, both technical calcium cyanamide (also called Lime Nitrogen) and nitrate containing calcium cyanamide, which are approved as fertilizers in Europe, contain calcium cyanamide as essential main ingredient. These fertilizers are used as soil fertilizers in a wide range of crops such as corn, potatoes and rice.

BRIEF DESCRIPTION OF THE DRAWINGS

FIG. 5 shows the resulting accumulated gas volumes of methane and carbon dioxide as detected in Example 5. The results refer to 1,000 kg of cattle liquid manure per test variant, whereby methane sample 1 (reference), methane sample 2 (Composition 1), $CO_2$ sample 1 (reference) and $CO_2$ sample 2 (Composition 1) are shown.

FIG. 6 shows the resulting accumulated gas volumes of methane and carbon dioxide as detected in Example 5. The results refer to 1,000 kg of cattle liquid manure per test variant, whereby methane sample 1 (reference), methane sample 2 (Composition 2), $CO_2$ sample 1 (reference) and $CO_2$ sample 2 (Composition 2) are shown.

FIG. 7 shows the resulting accumulated gas volumes of methane and carbon dioxide as detected in Example 5. The results refer to 1,000 kg of cattle liquid manure per test variant, whereby methane sample 1 (reference), methane sample 2 (Composition 4), $CO_2$ sample 1 (reference) and $CO_2$ sample 2 (Composition 4) are shown.

FIG. 8 shows the resulting accumulated gas volumes of methane and carbon dioxide as detected in Example 5. The results refer to 1,000 kg of cattle liquid manure per test variant, whereby methane sample 1 (reference), methane sample 2 (Composition 5), $CO_2$ sample 1 (reference) and $CO_2$ sample 2 (Composition 5) are shown.

FIG. 9 shows the resulting accumulated gas volumes of methane and carbon dioxide as detected in Example 5. The results refer to 1,000 kg of cattle liquid manure per test variant, whereby methane sample 1 (reference), methane sample 2 (Composition 6), $CO_2$ sample 1 (reference) and $CO_2$ sample 2 (Composition 6) are shown.

Figure 1:
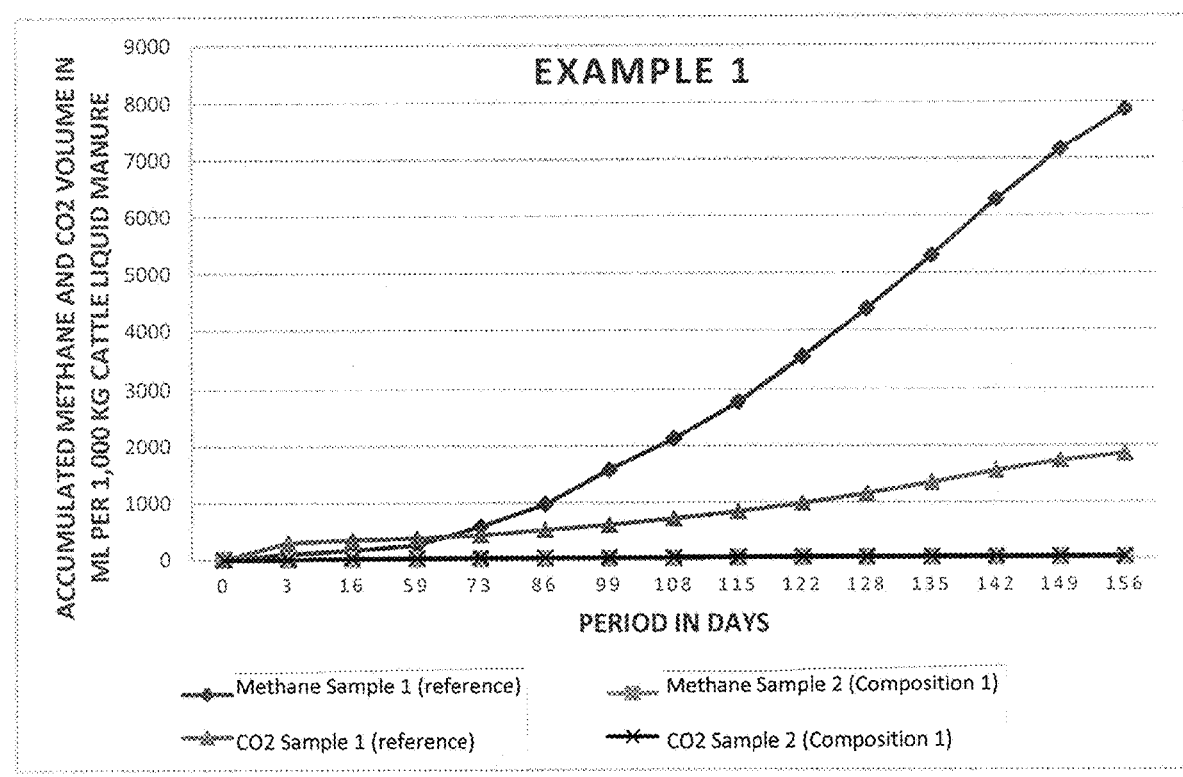
FIG. 1 shows the resulting accumulated gas volumes of methane and carbon dioxide as detected in Example 1. The results refer to 1,000 kg of cattle liquid manure per test variant, whereby methane sample 1 (reference), methane sample 2 (Composition 1), $CO_2$ sample 1 (reference) and $CO_2$ sample 2 (Composition 1) are shown.

According to the present invention, farm manure means a fertilizer as defined in Section 2, paragraphs (1), (2), (3), (4) and (5) of the Fertilizing Act (Fertilizing Act dated Jan. 9, 2009 (BGBI. I p. 54, 136), last amended by Article 1 of the Act of May 5, 2017 (BGBI. I p. 1068)). Thus, farm manures according to the present invention are fertilizers which,
  a) as animal faeces
    aa) in the keeping of animals for the production of food; or
    bb) in the case of other keeping of animals in agriculture or
  b) as plant substances in the course of plant production or in agriculture, also in mixtures with each other or after aerobic or anaerobic treatment, are accumulated or are produced.

The term farm manure thus also includes in particular
Solid manure: Farm manure from animal faeces, also with litter, in particular straw, sawdust, peat or other plant material added in the course of animal keeping, or mixed with feed remains, the dry matter content of which exceeds 15 percent;
Liquid manure: Farm manure from all animal faeces, even with small amounts of litter or feed remains or addition of water, the dry matter content of which does not exceed 15 percent;
Dung water or slurry: Farm manure from animal faeces, which is a mixture of urine and leached fine particles of faeces or litter and water; dung water or slurry may contain small amounts of feed remains and cleaning and precipitation water;
Biogas fermentation Farm manures from residues resulting from the fermentation of residues: organic materials of both plant and animal origin from biogas plants.

The process according to the invention is particularly suitable for reducing the emission of methane and/or carbon dioxide from liquid farm manures and in particular from liquid manure, dung water and/or biogas fermentation residues.

Surprisingly, it has been found that a composition comprising calcium cyanamide can reduce the emission of climate-damaging methane ($CH_4$) and carbon dioxide ($CO_2$) from farm manure during its storage in a very effective and very efficient way. It has been shown (see examples) that an amount of 1.38 kg of a composition comprising calcium cyanamide per 1 $m^3$ of farm manure can significantly reduce emissions of methane and carbon dioxide already 24 hours after addition of the composition.

Thus, the use of a composition comprising calcium cyanamide to reduce the emission of methane and/or carbon dioxide, from farm manure during its storage in a storage tank is also subject matter of the present invention.

Methane and carbon dioxide are odorless gases. For environmental reasons, it is desirable to reduce or completely avoid the emission of these gases.

Calcium cyanamide-containing compositions have been used as fertilizers for some time. However, the use of these fertilizers was detached from the use of a farm manure, since the application of farm manure is bound to legally prescribed times and these times are different from the recommended application times of calcium cyanamide-containing compositions. Thus, a reduction in the emission of climate-damaging gases has not been observed to date.

With the execution of the investigations on which the invention is based, it was also shown that during storage of the farm manure treated with a composition containing calcium cyanamide, no residues are produced which are to be evaluated as disadvantageous for the use of the same as a fertilizer. Thus, a farm manure treated according to the present invention can also be readily used as a fertilizer.

Of particular importance is that a farm manure treated in this way also does not undergo any significant changes in terms of its nitrogen content. By comparing the amounts used in the applications, this fact becomes particularly clear. For example, a calcium cyanamide-containing fertilizer approved in the EU, namely nitrate-containing calcium cyanamide, is applied at a rate of usually 400 kg per hectare (ha). With this application, a total nitrogen amount of 79.2 kg per ha is applied to the green or arable soil.

For farm manure, an application rate of up to 30 $m^3$ per ha of green or arable soil is to be regarded as standard application. The average amount of total nitrogen in cattle liquid manure is about 0.40% (cf. also Example 1), which results in 120 kg of total nitrogen per ha at an application rate of 30 $m^3$ per ha. If 2.93 kg of a composition comprising calcium cyanamide per $m^3$ of farm manure is added to the farm manure according to the present invention (cf. Example 1), the amount of total nitrogen in the treated farm manure increases to only 0.46%. Thus, the total amount of nitrogen added during the described application of the farm manure is only 18 kg more per ha of green or arable soil.

Thus, the total amount of farm manure per ha can remain essentially the same. This means that farm manure and commonly used nitrogen fertilizers, which have an effect profile different from that of farm manure, can be used in unchanged amounts over the year without fear of overfertilization. Thus, the application of a calcium cyanamide-containing composition incorporated into a farm manure according to the present invention is also clearly distinguished from a common fertilization with calcium cyanamide-containing fertilizers in terms of the total nitrogen applied.

The process according to the present invention is characterized by the fact that gas evolution from the farm manure is reduced solely by the addition of a composition comprising calcium cyanamide to the storage tank and by bringing the composition into contact with the farm manure. Thus, in accordance with the present invention, it is envisaged that process steps b) and c) may be carried out independently of any sequence. Thus, an addition of the composition according to process step c) can take place before, during or after the first filling of the storage tank with the farm manure. Should the addition take place prior to the first filling, the addition should take place within a reasonable period of time prior to contacting the farm manure. A period of less than one day is to be understood as reasonable.

The addition of the composition according to process step c) can take place in a completely empty storage tank or in a storage tank which is not completely empty, namely filled with residual contents. It is essential that the storage tank is or will be filled with at least 5% by volume of its capacity with farm manure. Thus, a sufficient mixing of the composition with the farm manure for the effect of the composition can be ensured.

It is considered advantageous if, during or after the addition of the calcium cyanamide-containing composition to the farm manure in the storage tank, the calcium cyanamide-containing composition and the farm manure are mixed, in particular by circulating the contents of the storage tank with a propeller mixer or with a stirring pump. In doing so, the calcium cyanamide-containing composition is added to the storage tank containing at least 5% by volume of farm manure and is stirred in. Subsequently, a further addition of the farm manure can take place. After completion of this addition, the farm manure is recirculated in the storage tank. The storage tank can be partially filled or completely filled.

Propeller mixers driven by a tractor or an electric motor are suitable for circulating the farm manure in the storage tank. Propeller agitators or built-in mixers, each with a submersible motor, which are permanently installed in the storage tank wall, have proved to be particularly suitable, as have tractor-mounted swing-in, articulated and tower propeller mixers, which are immersed in the storage tank with farm manure. Furthermore, agitator nozzles attached to feed pumps are suitable for circulating the farm manure in the storage tank, in particular long-shaft agitator pumps driven by an electric motor or tractor with an agitator nozzle or rotary pumps with a ripper.

According to a preferred embodiment of the process, the addition of the composition according to process step c) can be carried out once or in portions. Particularly preferably, the addition of the composition can i) take place once after or during the first addition of a first partial amount of farm manure to the storage tank, or ii) in portions after each partial filling of the storage tank, or iii) once after or during the complete filling of the storage tank with farm manure.

Thus, it is possible to carry out the addition of the composition comprising calcium cyanamide during or after a partial or complete filling of the storage tank. Here, too, it has proven advantageous if the contents of the storage tank are circulated during and after the addition of the composition comprising calcium cyanamide, in particular with a propeller mixer or with an agitator pump.

It is often the case that farm manure is continuously produced by livestock farming and collected in a storage tank filled with at least 5% by volume. Here, too, it is possible to add the composition comprising calcium cyanamide before, during or after the continuous filling with farm manure. It has also proved advantageous here if the farm manure in the storage tank is circulated during and after the addition of the composition comprising calcium cyanamide.

It is also considered advantageous if the addition of the composition comprising calcium cyanamide is carried out in portions before, during and after continuous or portionwise filling of the storage tank with farm manure. Again, it has been found to be advantageous here if the farm manure in the storage tank is circulated during and after the addition of the composition comprising calcium cyanamide.

The addition of the composition comprising calcium cyanamide takes place in open and in closed storage tanks with farm manure. Closed storage tanks are e.g. tanks or containers with a tent roof or concrete ceiling. Open storage tanks or containers do not have structural covers.

It should be emphasized at this point that the process according to the invention can be carried out in a non-limited variety of storage tanks. The size of the storage tank is not decisive. Thus, the volume X can have any reasonable size. In particular, X means a volume measured in $[m^3]$, which in particular is between $0.001\ m^3 \leq X \leq 20,000\ m^3$, preferably between $0.1\ m^3 \leq X \leq 10,000\ m^3$ and more preferably between $1\ m^3 \leq X \leq 10,000\ m^3$ and particularly preferably between $10\ m^3 \leq X \leq 10,000\ m^3$.

The method is further characterized in that the addition of the composition comprising calcium cyanamide takes place in a storage tank with farm manure, wherein the temperature of the farm manure in the storage tank is in a range from 0° C. to 60° C. The process is applicable to winter and midsummer conditions as well as to farm manure which are directly derived from a fermentation process or are in a secondary fermentation container or tank after a biogas process.

According to the present invention, a composition comprising calcium cyanamide is used in a process for reducing the emission of methane and/or carbon dioxide from farm manure during its storage.

According to the invention, the treatment time of the composition comprising calcium cyanamide to the farm manure for reducing the emission of methane and/or carbon dioxide is preferably at least 24 hours, more preferably >30 days, even more preferably >40 days and in particular >50 days. However, the storage time can also be significantly longer and, for example, up to 150 days or, if desired, >150 days.

According to the invention, the addition of a composition comprising calcium cyanamide can in particular reduce at least 30%, more preferably at least 40%, more preferably at least 50%, more preferably at least 60%, even more preferably at least 70% and particularly preferably at least 80% of the methane and/or carbon dioxide emission from farm manure (compared to untreated farm manure).

Thus, the use of a composition comprising calcium cyanamide for reducing the emission of methane and/or carbon dioxide from farm manure during its storage in a storage tank is also subject matter of the present invention.

Furthermore, tests have shown that an addition of the calcium cyanamide-containing composition can take place at any time during storage (cf. examples). Thus, it has been shown that an addition after several weeks of storage of the farm manure also enables a reduction in the emission of methane and carbon dioxide. Thus, the use of a composition comprising calcium cyanamide as fermentation stopper or inhibitor of anaerobic fermentation of farm manure and/or as an inhibitor of microbial degradation of organic substrates in farm manure during its storage in a storage tank is also subject matter of the present invention.

Preferably, a composition comprising 10 to 100 wt. % calcium cyanamide (wt. % based on the composition) can be applied in the use or process according to the invention. Particularly preferred in this regard is a composition comprising at least 20 wt. %, more preferably at least 25 wt. %, more preferably at least 30 wt. %, more preferably at least 35 wt. %, more preferably at least 40 wt. %, more preferably at least 45 wt. %, more preferably at least 50 wt. %, more preferably at least 60 wt. %, and up to 100 wt. %, in particular up to 95 wt. %, in particular up to 80 wt. %, in particular up to 55 wt. % of calcium cyanamide (based on the composition).

In the context of the present invention, indications in wt. % are to be understood as indications of the weight of an ingredient or a group of ingredients based on a composition whose ingredients add up to 100 wt. %.

According to a further embodiment of the invention, the calcium cyanamide may be applied to a substrate. This substrate may be a material inert for agricultural purposes, an adjuvant approved for agricultural purposes or a fertilizer. According to the present invention, calcium carbonate and/or related substances or mineral fertilizers are particularly preferred as substrate. These substrates may originate from commercial processes and may contain an amount of free carbon, charcoal or graphite. At the same time or independently thereof, it may also be provided that the calcium cyanamide is used mixed with further ingredients.

Particularly preferred in the use or process according to the invention can thus be applied a composition which comprises
 a) calcium cyanamide,
 b) at least one compound from the group of carbonates, oxides and hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, and
 c) more preferably optionally free carbon, charcoal or graphite.

The proportions of the other ingredients or substrates may vary. Preferably, the composition may comprise at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, wherein the amount of the at least one compound from the group of carbonates, oxides and hydroxides, or mixtures thereof is at least 5 wt. %, preferably at least 10 wt. %, more preferably at least 15 wt. %, more preferably at least 20 wt. %, and at the same time at most 50 wt. %, in particular at most 40 wt. %, in particular at most 35 wt. %, in particular at most 25 wt. % (wt. % based on the composition).

The amount of free carbon, charcoal or graphite in the composition can be up to 15 wt. % (based on the composition).

Furthermore, the composition, based on the production, may contain up to 10 wt. % of water (based on the composition).

Particularly preferred in the use or process according to the invention can thus be used a composition which comprises (based on the composition)
 a) 25 to 95 wt. % calcium cyanamide,
 b) 5 to 40 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof.

Thus, more preferably, in the use or process according to the invention, a composition may be used which comprises (based on the composition)
 a) 25 to 95 wt. % calcium cyanamide,
 b) 5 to 40 wt. % at least one compound from the group of carbonates, oxides and hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
 c) up to 15 wt. % free carbon, charcoal or graphite, and
 d) up to 10 wt. % water.

According to a more preferred embodiment of the use or process according to the invention, a composition may be used which comprises (based on the composition)
 a) 60 to 95 wt. % calcium cyanamide,
 b) 5 to 25 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
 c) up to 15 wt. % free carbon, charcoal or graphite, and
 d) up to 10 wt. % water.

In the tests underlying the invention, it has been shown that in particular a composition comprising calcium cyanamide and at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, shows a very good reduction in the emission of methane and carbon dioxide from farm manure. This fact is even more surprising as, for example, calcium carbonate alone shows no impact on this effect or calcium hydroxide alone shows an additional effect on the emission of these gases (cf. Example 5).

Particularly preferred thus also the use of a composition comprising
 a) calcium cyanamide and
 b) at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, for reducing the emission of methane and/or carbon dioxide from farm manure during its storage in a storage tank is subject matter of the present invention.

Particularly preferred is the use of a composition that has a reduction potential for reducing the emission of methane and/or carbon dioxide from farm manure of at least 4.0 l of methane and/or carbon dioxide per kg of farm manure over a storage period of at least 150 days.

Furthermore, it has been found in these tests that a minimum amount of at least one compound from the group of carbonates, oxides or hydroxides, in particular from the group magnesium carbonate, magnesium hydrogen carbonate, magnesium oxide, magnesium hydroxide, calcium carbonate, calcium hydrogen carbonate, calcium oxide and calcium hydroxide, or mixtures thereof, should be present in order to be able to provide a long-lasting reduction of methane. Thus, it has been shown that a minimum amount of at least 5 wt. % of compounds from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, should be contained in the composition in order to be able to provide long-lasting reduction of the emission of methane. If this minimum value is not maintained, a methane emission increase can be observed after about 100 days (see example 5).

Thus, according to a further preferred embodiment of the use or process according to the invention, a composition can be used which comprises (based on the composition)
a) 60 to 95 wt. % calcium cyanamide,
b) 5 to 25 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
c) up to 15 wt. % free carbon, charcoal or graphite, and
d) up to 10 wt. % water.

Using such a composition, an emission of methane and/or carbon dioxide can be very effectively reduced or almost suppressed. Thus, according to a further preferred embodiment of the use or process according to the invention, a composition can be used which comprises (based on the composition)
a) 60 to 95 wt. % calcium cyanamide,
b) 10 to 25 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
c) up to 15 wt. % free carbon, charcoal or graphite, and
d) up to 10 wt. % water.

Further preferred, it may also be provided that the composition does not comprise any other compound, in particular none approved as a fertilizer. More particularly preferably, the composition does not comprise or contain urea. Urea contains a nitrogen content of 46.6 wt. % and would thus lead to a significant increase in the nitrogen content in the farm manure, which is contrary to the problem definition of the present invention.

According to a further preferred embodiment, it may also be provided that the composition further comprises at least one salt from the group of nitrates, in particular from the group of sodium nitrate, potassium nitrate, magnesium nitrate and calcium nitrate, or mixtures thereof.

Thus, in the use or process according to the invention, a composition can be used which comprises (based on the composition)
a) calcium cyanamide,
b) at least one compound from the group of carbonates, oxides and hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, and
c) at least one salt from the group of nitrates, in particular from the group of sodium nitrate, potassium nitrate, magnesium nitrate and calcium nitrate, or mixtures thereof, and
d) further preferably free carbon, charcoal or graphite.

The amount of nitrates may vary, and the composition may comprise up to 20 wt. % of nitrates. Preferably, the composition may comprise at least one salt selected from the group consisting of nitrates, in particular from the group consisting of sodium nitrate, potassium nitrate, magnesium nitrate and calcium nitrate, or mixtures thereof, wherein the amount of nitrates is at most 20 wt. %, preferably at most 15 wt. %, more preferably at most 10 wt. %, more preferably at most 5 wt. %, and more preferably at least 1 wt. % (based on the composition).

Particularly preferred in the use or process according to the invention can thus be used a composition which comprises (based on the composition)
a) 25 to 95 wt. % calcium cyanamide,
b) 5 to 40 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
c) up to 20 wt. % at least one salt from the group of nitrates, in particular from the group of sodium nitrate, potassium nitrate, magnesium nitrate and calcium nitrate, or mixtures thereof,
d) up to 15 wt. % free carbon, charcoal or graphite, and
e) up to 10 wt. % water.

According to a particularly preferred embodiment of the use or process according to the invention, a composition can be used that comprises (based on the composition)
a) 50 to 80 wt. % calcium cyanamide,
b) 5 to 25 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof,
c) 1 to 15 wt. % free carbon, charcoal or graphite, and
d) up to 10 wt. % water.

According to an alternatively preferred embodiment of the use or process according to the invention, a composition can be used which comprises (based on the composition)
a) 35 to 55 wt. % calcium cyanamide,
b) 15 to 35 wt. % at least one compound from the group of carbonates, oxides or hydroxides, in particular from the group of magnesium carbonate, magnesium hydrogen carbonate, magnesium oxide, magnesium hydroxide, calcium carbonate, calcium hydrogen carbonate, calcium oxide and calcium hydroxide, or mixtures thereof, c) 1 to 20 wt. % at least one nitrate selected from the group consisting of sodium nitrate, potassium nitrate, magnesium nitrate and calcium nitrate, or mixtures thereof, d) 1 to 15 wt. % free carbon, charcoal or graphite, and e) up to 10 wt. % water.

More particularly preferably, calcium cyanamide and, further preferably, calcium cyanamide or nitrate-containing calcium cyanamide according to Regulation (EC) No. 2003/2003 of the European Parliament and of the Council of Oct. 13, 2003 relating to fertilizers can be used as composition comprising calcium cyanamide in the process and use according to the invention.

The composition according to the invention can be used in different application forms both in the use according to the invention and in the process according to the invention and can be adapted to the needs of the user. Thus, the compositions described herein can be used in the form of a solid, in particular in the form of a powder, a granule, or in the form of a suspension, in particular a suspension of these solids.

The total amount of the composition comprising calcium cyanamide to be applied can also be varied within relatively broad limits both in the use according to the invention and in the process according to the invention. Thus, it has been shown that the composition can be used in an amount of from 0.5 to 10 kg per 1 $m^3$ of farm manure, in particular from 1.0 to 10 kg per 1 $m^3$ of farm manure, in particular from 1.0 to 8 kg per 1 $m^3$ of farm manure, particularly preferably from 1.0 to 6 kg per 1 $m^3$ of farm manure and most preferably from 1.0 to 5 kg per 1 $m^3$ of farm manure. It is essential that the composition comprises calcium cyanamide, particularly in the amounts described herein. Thus, the composition may further preferably comprise any of the above compositions. Independently thereof, the composition may thus also comprise other ingredients.

EXAMPLES

Example 1

Reduction of methane and $CO_2$ emissions from cattle liquid manure 1.1 Ingredients:

Fresh cattle liquid manure (=farm manure):

From dairy cattle barn (Community Obing, Bavaria)

Without dilution by rinsing waters, cleaning waters or similar waters

Without litter

Taken from the pre-chamber of the discharge channel in the direction of the slurry pit Analyses: total nitrogen: 0.40 wt. %

Ammonium ($NH_4$): 0.13 wt. % (equivalent to 0.10% $NH_4$ nitrogen).

Nitrate nitrogen: <20 mg/kg

Dry matter: 11.93 wt. % pH value: 7.4 (13° C.)

Conductivity: 19.5 mS/cm (13° C.)

Composition comprising calcium cyanamide (Composition 1):

Calcium cyanamide: 44.0 wt. %

Calcium nitrate: 11.1 wt. %

Calcium hydroxide: 13.4 wt. %

Calcium carbonate: 10.0 wt. %

Free carbon: 10.0 wt. %

Magnesium carbonate: 2.3 wt. %

Water: 9.2 wt. %

Fertilizer "Nitrate-containing calcium cyanamide" according to A.1. Nitrogen fertilizer No. 3 (b) according to Regulation (EC) No. 2003/2003 of the European Parliament and of the Council of 13 Oct. 2003 relating to fertilizers.

1.2 Experimental Procedure:

In a 6 liter wide-neck container made of polyethylene (PE) with a tight-fitting lid, 3024 mL (equivalent to 2953 g) of cattle liquid manure of the described composition (cf. 1.1) were provided. Subsequently, 8.86 g of Composition 1 was added (equivalent to 2.93 kg of composition comprising calcium cyanamide or 16.1 mol of calcium cyanamide per $m^3$ of cattle liquid manure) and stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented $CO_2$ from the air from falsifying the measurement results. The mixture was stored for exactly 156 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:

pH value: 7.5 (22° C.)

Conductivity: 19.8 mS/cm (22° C.)

Reference Experiment:

In a 6 liter wide-neck container made of polyethylene (PE) with a tight-fitting lid, 3018 mL (corresponding to 2947 g) of cattle liquid manure of the described composition (cf. 1.1) were added. The wide-neck container was then tightly closed. An opening was drilled in the lid of the wide-neck container, in which a sealed gas storage bag (nominal volume 5.6 liters) was connected and in which the released gas volume was collected. This structure prevented atmospheric oxygen from entering the wide-neck container. The mixture was stored for exactly 156 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

During the experimental period, the gas storage bags were changed after 3, 16, 59, 73, 86, 99, 108, 115, 122, 128, 135, 142, 149 and 156 days, the collected gas volume was determined volumetrically and the gas composition was measured by gas chromatography.

1.3 Results:

The resulting gas volumes of methane and carbon dioxide are shown in Table 1 below (see also FIG. 1—chart of methane and $CO_2$ emissions from Example 1). The results refer to 1,000 kg of cattle liquid manure per test variant.

TABLE 1

Gas volumes produced, based on 1,000 kg of cattle liquid manure

| Experimental period [days] | Sample 1 (reference) | | Sample 2 (Composition 1) | |
|---|---|---|---|---|
| | Methane [mL] | CO$_2$ [mL] | Methane [mL] | CO$_2$ [mL] |
| 3 | 95 [95] | 291 [291] | 2 [2] | 4 [4] |
| 16 | 65 [160] | 52 [343] | 2 [4] | 16 [20] |
| 59 | 88 [248] | 27 [370] | 1 [5] | 3 [23] |
| 73 | 324 [572] | 54 [424] | 2 [7] | 2 [25] |
| 86 | 401 [973] | 89 [513] | 2 [9] | 2 [27] |
| 99 | 592 [1565] | 95 [608] | 2 [11] | 0 [27] |
| 108 | 564 [2129] | 104 [712] | 2 [13] | 2 [29] |
| 115 | 651 [2780] | 124 [836] | 1 [14] | 2 [31] |
| 122 | 756 [3536] | 147 [983] | 1 [15] | 0 [31] |
| 128 | 833 [4369] | 169 [1152] | 1 [16] | 1 [32] |
| 135 | 934 [5303] | 190 [1342] | 2 [18] | 2 [34] |
| 142 | 985 [6288] | 205 [1547] | 2 [20] | 1 [35] |
| 149 | 876 [7164] | 181 [1728] | 2 [22] | 2 [37] |
| 156 | 707 [7871] | 125 [1853] | 1 [23] | 2 [39] |

The values refer to the time period, the values in brackets are the accumulated values over the entire test period. A chart is shown as FIG. 1.

1.4 Summary of Results:
Methane emissions:
After 156 days of storage, 7871 mL of methane gas related to 1,000 kg of cattle liquid manure was released in the reference experiment (Sample 1). By adding 8.86 g calcium cyanamide in the form of Composition 1 comprising calcium cyanamide (Sample 2), which corresponds to 2.93 kg composition comprising calcium cyanamide or a substance amount concentration of 16.1 mol calcium cyanamide per m$^3$ cattle liquid manure, these emissions can be reduced by 99.7% to 23 mL methane gas.

CO$_2$ emissions:
A similar picture emerges here. After 156 days of storage, 1853 mL of CO$_2$ gas related to 1,000 kg of slurry was released in the reference experiment (Sample 1). By adding 8.86 g calcium cyanamide in the form of Composition 1 comprising calcium cyanamide (Sample 2), which corresponds to 2.93 kg composition comprising calcium cyanamide or a substance amount concentration of 16.1 mol calcium cyanamide per m$^3$ cattle liquid manure, these emissions can be reduced by 97.9% to 39 mL CO$_2$ gas Example 2

Reduction of Methane and CO$_2$ Emissions from Cattle Liquid Manure 2.1 Ingredients:
Fresh cattle liquid manure (=farm manure):
From dairy cattle barn (Community Obing, Bavaria)
Without dilution by rinsing waters, cleaning waters or similar waters
Without litter
Taken from the pre-chamber of the discharge channel in the direction of the slurry pit
Analyses: total nitrogen: 0.48 wt. %
Ammonium (NH$_4$): 0.22 wt. % (equivalent to 0.17% NH$_4$ nitrogen).
Nitrate nitrogen: <20 mg/kg
Dry matter: 10.30 wt. %
pH value: 6.8 (24° C.)
Conductivity: 18.5 mS/cm (24° C.)

A composition comprising calcium cyanamide (Composition 2):
Calcium cyanamide: 67.7 wt. %
Calcium oxide: 13.2 wt. %
Calcium hydroxide: 3.2 wt. %
Free carbon: 13.3 wt. %
Water 2.6 wt. %
Fertilizer "Calcium cyanamide" corresponding to A.1. Nitrogen fertilizer No. 3 (a) according to Regulation (EC) No. 2003/2003 of the European Parliament and of the Council of 13 Oct. 2003 relating to fertilizers.

2.2 Experimental Procedure:
In a 6 liter wide-neck container made of polyethylene (PE) with a tight-fitting lid, 3090 mL (equivalent to 3032 g) of cattle liquid manure of the described composition (cf. 2.1) were added. Subsequently, 4.25 g of Composition 2 was added (equivalent to 1.38 kg of composition comprising calcium cyanamide or 11.6 mol of calcium cyanamide per m$^3$ of cattle liquid manure) and stirred in. After stirring in, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented CO$_2$ from the air from falsifying the measurement results. The mixture was stored for exactly 156 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.5 (24° C.)
Conductivity: 18.9 mS/cm (24° C.)

Reference Experiment:
In a 6 liter wide-neck container made of polyethylene (PE) with a tight-fitting lid, 3038 mL (equivalent to 2981 g) of cattle liquid manure of the described composition (cf. 2.1) were added. The wide-neck container was then tightly closed. An opening was drilled in the lid of the wide-neck container, in which a sealed gas storage bag (nominal volume 5.6 liters) was connected and in which the released gas volume was collected. This structure prevented atmospheric oxygen from entering the wide-neck container. The mixture was stored for exactly 156 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

During the experimental period, the gas storage bags were changed after 7, 44, 57, 70, 79, 89, 96, 103, 110, 117, 127, 141 and 156 days, the collected gas volume was determined volumetrically and the gas composition was measured by gas chromatography.

Figure 2:
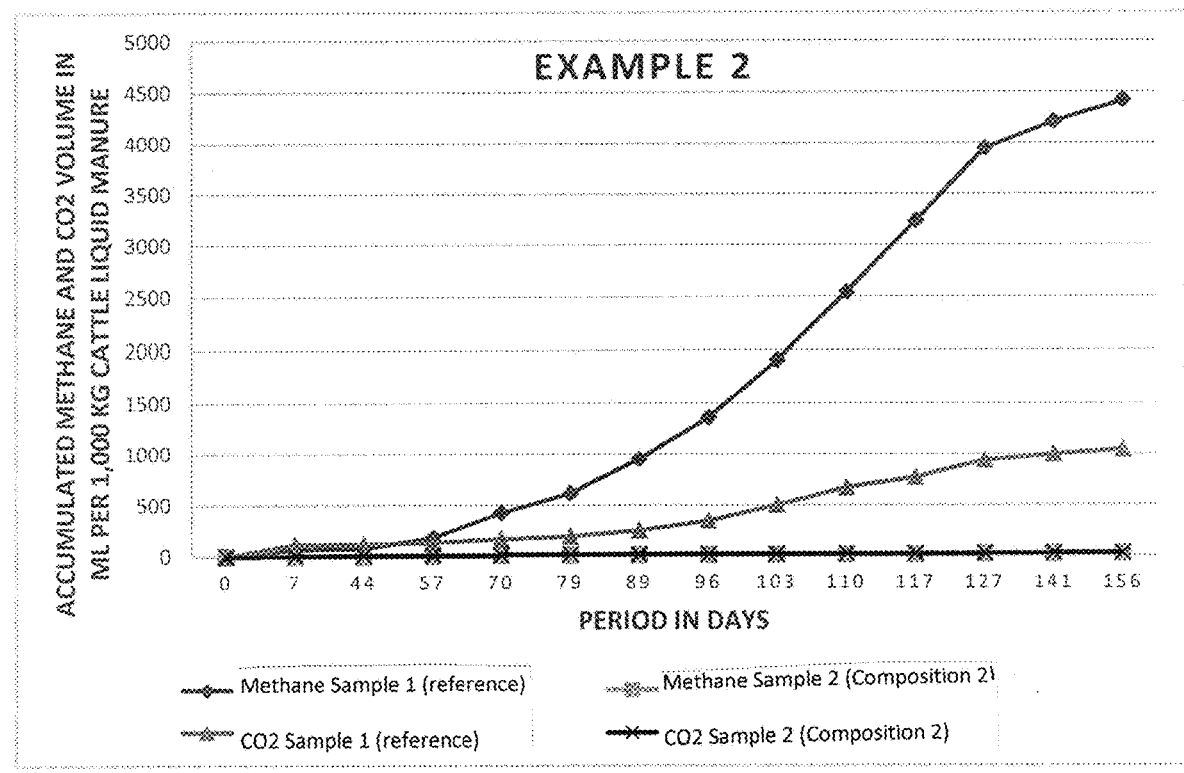
FIG. 2 shows the resulting accumulated gas volumes of methane and carbon dioxide as detected in Example 2. The results refer to 1,000 kg of cattle liquid manure per test variant, whereby methane sample 1 (reference), methane sample 2 (Composition 2), $CO_2$ sample 1 (reference) and $CO_2$ sample 2 (Composition 2) are shown.

2.3 Results:
The resulting gas volumes of methane and carbon dioxide are shown in Table 2 below (see also FIG. 2—chart of methane and CO$_2$ emissions from Example 2). The results refer to 1,000 kg of cattle liquid manure per experimental variant.

TABLE 2

Gas volumes produced, based on 1,000 kg of cattle liquid manure

| Experimental period [days] | Sample 1 (reference) | | Sample 2 (Composition 2) | |
|---|---|---|---|---|
| | Methane [mL] | $CO_2$ [mL] | Methane [mL] | $CO_2$ [mL] |
| 7 | 70 [70] | 118 [118] | 2 [2] | 6 [6] |
| 44 | 11 [81] | 5 [123] | 3 [5] | 5 [11] |
| 57 | 101 [182] | 15 [138] | 1 [6] | 2 [13] |
| 70 | 244 [426] | 31 [169] | 2 [8] | 2 [15] |
| 79 | 190 [616] | 26 [195] | 2 [10] | 2 [17] |
| 89 | 331 [947] | 58 [253] | 2 [12] | 2 [19] |
| 96 | 416 [1363] | 94 [347] | 2 [14] | 1 [20] |
| 103 | 544 [1907] | 153 [500] | 2 [16] | 2 [22] |
| 110 | 637 [2544] | 171 [671] | 2 [18] | 2 [24] |
| 117 | 691 [3235] | 198 [769] | 1 [19] | 1 [25] |
| 127 | 714 [3949] | 168 [937] | 2 [21] | 1 [26] |
| 141 | 261 [4210] | 58 [995] | 2 [23] | 2 [28] |
| 156 | 206 [4416] | 48 [1043] | 2 [25] | 2 [30] |

The values refer to the time period, the values in brackets are the accumulated values over the entire test period. A chart is shown as FIG. 2.

2.4 Summary of Results:

Methane emissions:

After 156 days of storage, 4416 mL of methane gas related to 1,000 kg of cattle liquid manure was released in the reference experiment (Sample 1). By adding 4.25 g calcium cyanamide in the form of Composition 2 comprising calcium cyanamide (Sample 2), which corresponds to 1.38 kg composition comprising calcium cyanamide or a substance amount concentration of 11.6 mol calcium cyanamide per $m^3$ cattle liquid manure, these emissions can be reduced by 99.4% to 25 mL methane gas.

$CO_2$ emissions:

A similar picture emerges here. After 156 days of storage, 1043 mL of $CO_2$ gas related to 1,000 kg of cattle slurry was released in the reference experiment (Sample 1). By adding 4.25 g calcium cyanamide in the form of Composition 2 comprising calcium cyanamide (Sample 2), which corresponds to 1.38 kg composition comprising calcium cyanamide or a substance amount concentration of 11.6 mol calcium cyanamide per $m^3$ cattle liquid manure, these emissions can be reduced by 97.1% to 30 mL $CO_2$ gas

Example 3

Comparative Example with Hydrogencyanamide Solution

Reduction of methane and $CO_2$ emissions from cattle liquid manure 3.1 Ingredients:

Fresh cattle liquid manure (=farm manure):
From dairy cattle barn (Community Obing, Bavaria)
Without dilution by rinsing waters, cleaning waters or similar waters
Without litter
Taken from the pre-chamber of the discharge channel in the direction of the slurry pit
Analyses: total nitrogen: 0.42 wt. %
Ammonium ($NH_4$): 0.23 wt. % (equivalent to 0.18% $NH_a$ nitrogen)
Nitrate nitrogen: <20 mg/kg
Dry matter: 9.69 wt. %
pH value: 7.5 (23° C.)
Conductivity: 18.0 mS/cm (23° C.)

Composition comprising hydrogencyanamide (Composition 3):
Hydrogencyanamide: 50.2 wt. %
Water: 49.8 wt. %

3.2 Experimental Procedure:

In a 6 liter wide-neck container made of polyethylene (PE) with a tight-fitting lid, 3030 mL (equivalent to 2979 g) of cattle liquid manure of the described composition (cf. 3.1) were added. Subsequently, 2.98 g of Composition 3 was added (equivalent to 0.983 kg of composition comprising hydrogencyanamide or 12.2 mol of hydrogencyanamide per $m^3$ of cattle liquid manure) and stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented $CO_2$ from the air from falsifying the measurement results. The mixture was stored for exactly 150 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.5 (23° C.)
Conductivity: 18.0 mS/cm (23° C.)

Reference Experiment:

In a 6 liter wide-neck container made of polyethylene (PE) with a tight-fitting lid, 3075 mL (corresponding to 3023 g) of cattle liquid manure of the described composition (cf. 3.1) were added. The wide-neck container was then tightly closed. An opening was drilled in the lid of the wide-neck container, in which a sealed gas storage bag (nominal volume 5.6 liters) was connected and in which the released gas volume was collected. This structure prevented atmospheric oxygen from entering the wide-neck container. The mixture was stored for exactly 150 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

During the experimental period, the gas storage bags were changed after 11, 57, 66, 78, 88, 95, 106, 120, 137 and 150 days, the collected gas volume was determined volumetrically and the gas composition was measured by gas chromatography.

Figure 3:
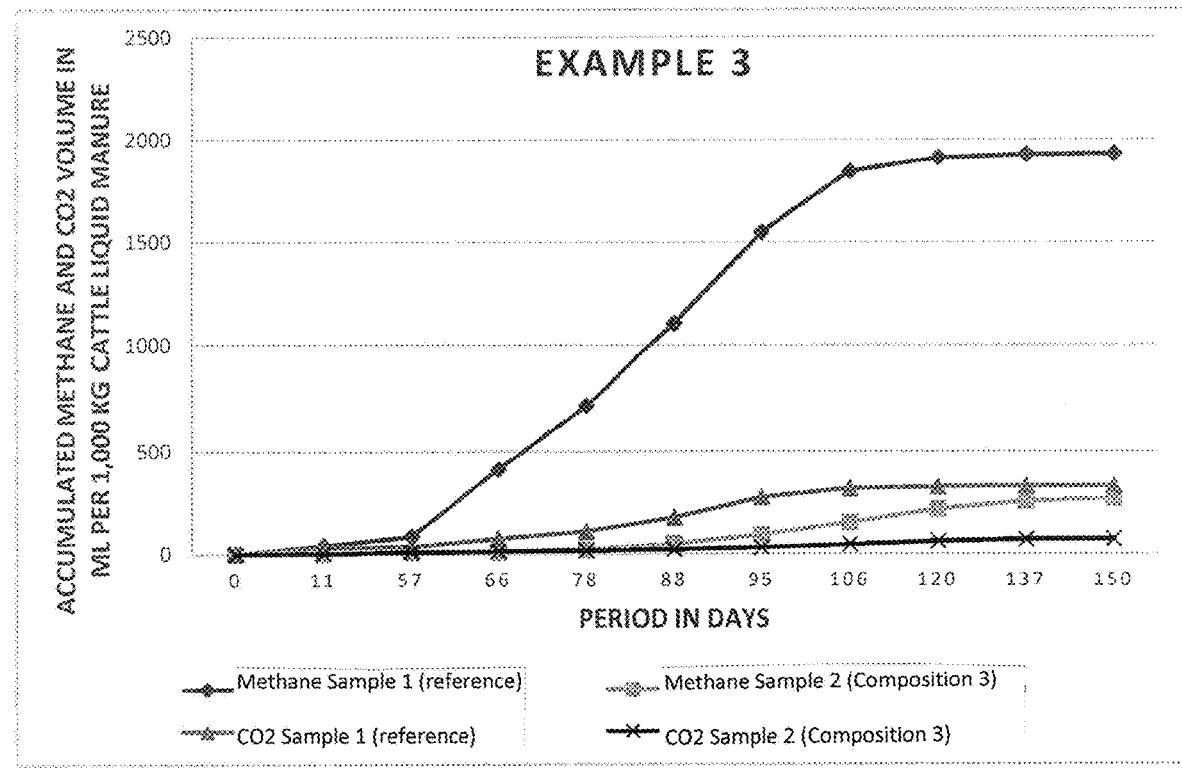
FIG. 3 shows the resulting accumulated gas volumes of methane and carbon dioxide as detected in Example 3. The results refer to 1,000 kg of cattle liquid manure per test variant, whereby methane sample 1 (reference), methane sample 2 (Composition 3), $CO_2$ sample 1 (reference) and $CO_2$ sample 2 (Composition 3) are shown.

3.3 Results:

The resulting gas volumes of methane and carbon dioxide are shown in Table 3 below (see also FIG. 3—chart of methane and $CO_2$ emissions from Comparative Example 3). The results refer to 1,000 kg of cattle liquid manure per test variant.

TABLE 3

Gas volumes produced, based on 1,000 kg of cattle liquid manure

| Experimental period [days] | Sample 1 (reference) | | Sample 2 (Composition 3) | |
|---|---|---|---|---|
| | Methane [mL] | CO$_2$ [mL] | Methane [mL] | CO$_2$ [mL] |
| 11 | 41 [41] | 31 [31] | 2 [2] | 4 [4] |
| 57 | 44 [85] | 6 [37] | 3 [5] | 8 [12] |
| 66 | 325 [410] | 38 [75] | 4 [9] | 2 [14] |
| 78 | 319 [729] | 35 [110] | 12 [21] | 3 [17] |
| 88 | 375 [1104] | 66 [176] | 29 [50] | 6 [23] |
| 95 | 444 [1548] | 100 [276] | 43 [93] | 9 [32] |
| 106 | 296 [1844] | 43 [319] | 59 [152] | 14 [46] |
| 120 | 67 [1911] | 7 [326] | 66 [218] | 17 [63] |
| 137 | 17 [1928] | 2 [328] | 38 [256] | 7 [70] |
| 150 | 3 [1931] | 2 [330] | 13 [269] | 2 [72] |

The values refer to the time period, the values in brackets are the accumulated values over the entire test period. A chart is shown as FIG. 3.

3.4 Summary of Results:

Methane Emissions:
After 150 days of storage, 1931 mL of methane gas related to 1,000 kg of cattle liquid manure was released in the reference experiment (Sample 1). By adding 2.98 g hydrogencyanamide in the form of Composition 3 (Sample 2), which corresponds to 0.983 kg composition comprising hydrogencyanamide or a substance amount concentration of 12.2 mol hydrogencyanamide per m$^3$ cattle liquid manure, these emissions can only be reduced by 82.9% to 330 mL. In addition, a significant methane development could already be measured after 78 days of storage.

CO$_2$ Emissions:
After 150 days of storage, 330 mL of CO$_2$ gas related to 1,000 kg of cattle liquid manure was released in the reference experiment (Sample 1). By adding 2.98 g hydrogencyanamide in the form of Composition 3 (Sample 2), which corresponds to 0.983 kg composition comprising hydrogencyanamide or a substance amount concentration of 12.2 mol hydrogencyanamide per m$^3$ cattle liquid manure, these emissions can only be reduced by 78.2% to 72 mL.

Compared to Example 2, where a comparable substance concentration was added, but as a composition comprising calcium cyanamide, the gas emissions in the comparative example—both methane and CO$_2$—are significantly higher in absolute amount. Furthermore, the gas emissions start again after a considerably shorter time; in Example 3, a significant methane emission could be measured after 78 days of storage, whereas in Example 2, no significant gas emission could be detected after 156 days of storage.

Example 4

Use of a composition comprising calcium cyanamide as a fermentation stopper or inhibitor of anaerobic fermentation of cattle liquid manure and as an inhibitor of microbial degradation of organic substances in farm manure during storage thereof.

4.1 Ingredients:
Fresh cattle liquid manure (=farm manure):
From dairy cattle barn (Community Obing, Bavaria)
Without dilution by rinsing waters, cleaning waters or similar waters
Without litter
Taken from the pre-chamber of the discharge channel in the direction of the slurry pit
Analyses: total nitrogen: 0.48 wt. %
Ammonium (NH$_4$): 0.22 wt. % (equivalent to 0.17% NHa nitrogen).
Nitrate nitrogen: <20 mg/kg
Dry matter: 10.30 wt. %
pH value: 6.8 (24° C.)
Conductivity: 18.5 mS/cm (24° C.)

A composition comprising calcium cyanamide (Composition 1):
Calcium cyanamide: 44.0 wt. %
Calcium nitrate: 11.1 wt. %
Calcium hydroxide: 13.4 wt. %
Calcium carbonate: 10.0 wt. %
Free carbon: 10.0 wt. %
Magnesium carbonate: 2.3 wt. %
Water: 9.2 wt. %

Fertilizer "Nitrate containing calcium cyanamide" according to A.1. Nitrogen fertilizer No. 3 (b) according to Regulation (EC) No. 2003/2003 of the European Parliament and of the Council of 13 October 2003 relating to fertilizers.

4.2 Experimental Procedure:
In a 6 liter wide-neck container made of polyethylene (PE) with a tight-fitting lid, 3058 mL (corresponding to 3001 g) of cattle liquid manure of the described composition (cf. 4.1) were added. The wide-neck container was then tightly closed. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented CO$_2$ from the air from falsifying the measurement results. The mixture was stored for exactly 110 days without stirring or agitation at a temperature of 23±1° C. and at an air pressure of 960 to 980 hPa and at 493 m above standard sea level (NHN). During the experimental period, the gas storage bags were exchanged after 7, 44, 57, 70, 79, 89, 96, 103 and 110 days, the collected gas volume was determined volumetrically and the gas composition was measured by gas chromatography.

On the 110th day of the experiment, the container was placed in a box, also known as a glove box, and this was flushed with nitrogen until there was less than 0.1 vol. % oxygen in the glove box. The container lid was then unscrewed and 6.60 g of Composition 1 was added (equivalent to 2.16 kg of composition comprising calcium cyanamide or 11.9 mol calcium cyanamide per m$^3$ of cattle liquid manure) and stirred in. Afterwards, the container lid was immediately screwed back on, the wide-neck container tightly closed, a gas storage bag (nominal volume 5.6 liters) connected and further stored without stirring or agitation at a temperature of 23±1° C. and at an air pressure of 960 to 980 hPa and at 493 m above standard sea level (NHN).

After additional 7, 17, 31, and 46 days, corresponding to 117, 127, 141, and 156 days total period, the gas storage bags were exchanged, the stored gas volume was determined volumetrically, and the gas composition was analyzed by gas chromatography.

Reference Experiment:
In a 6 liter wide-neck container made of polyethylene (PE) with a tight-fitting lid, 3038 mL (corresponding to 2981 g) of cattle liquid manure of the described composition (cf. 4.1) were added. The wide-neck container was then tightly closed. An opening was drilled in the lid of the wide-neck container, in which a sealed gas storage bag (nominal volume 5.6 liters) was connected and in which the released gas volume was collected. This structure prevented atmospheric oxygen from entering the wide-neck container. The mixture was stored for exactly 156 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

During the experimental period, the gas storage bags were changed after 7, 44, 57, 70, 79, 89, 96, 103, 110, 117, 127, 141 and 156 days, the collected gas volume was determined volumetrically and the gas composition was measured by gas chromatography.

Figure 4:
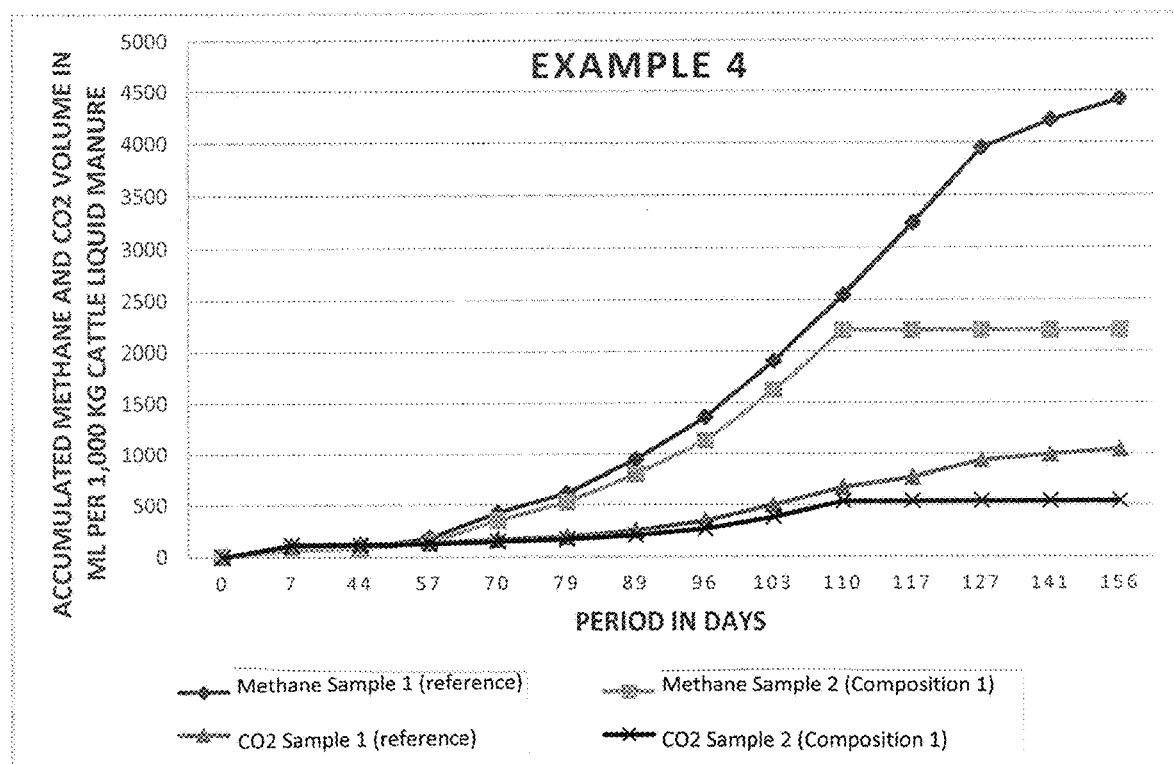
FIG. 4 shows the resulting accumulated gas volumes of methane and carbon dioxide as detected in Example 4. The results refer to 1,000 kg of cattle liquid manure per test variant, whereby methane sample 1 (reference), methane sample 2 (Composition 1), $CO_2$ sample 1 (reference) and $CO_2$ sample 2 (Composition 1) are shown.

4.3 Results:

The resulting gas volumes of methane and carbon dioxide are shown in Table 4 below (see also FIG. 4—chart of methane and $CO_2$ emissions from Example 4). The results refer to 1,000 kg of cattle liquid manure per test variant.

TABLE 4

Gas volumes produced, based on 1,000 kg of cattle liquid manure

| Experimental period [days] | Sample 1 (reference) | | Sample 2 (From 110th day with Composition 1) | |
|---|---|---|---|---|
| | Methane [mL] | $CO_2$ [mL] | Methane [mL] | $CO_2$ [mL] |
| 7 | 70 [70] | 118 [118] | 70 [70] | 113 [113] |
| 44 | 11 [81] | 5 [123] | 12 [82] | 5 [118] |
| 57 | 101 [182] | 15 [138] | 61 [143] | 10 [128] |
| 70 | 244 [426] | 31 [169] | 208 [351] | 22 [150] |
| 79 | 190 [616] | 26 [195] | 177 [528] | 21 [171] |
| 89 | 331 [947] | 58 [253] | 270 [798] | 38 [209] |
| 96 | 416 [1363] | 94 [347] | 332 [1130] | 59 [268] |
| 103 | 544 [1907] | 153 [500] | 490 [1620] | 115 [383] |
| 110 | 637 [2544] | 171 [671] | 576 [2196] | 152 [535] |
| 117 | 691 [3235] | 198 [769] | 2 [2198] | 2 [537] |
| 127 | 714 [3949] | 168 [937] | 0 [2198] | 0 [537] |
| 141 | 261 [4210] | 58 [995] | 0 [2198] | 0 [537] |
| 156 | 206 [4416] | 48 [1043] | 0 [2198] | 1 [538] |

The values refer to the time period, the values in brackets are the accumulated values over the entire test period. A chart is shown as FIG. 4.

4.4 Summary of Results:

Methane Emissions:

After 156 days of storage, 4416 mL of methane gas was released in the reference experiment (Sample 1) relative to 1,000 kg of cattle liquid manure. The development of methane release in Sample 2 was similar to Sample 1 until the 110th day. By adding 6.60 g calcium cyanamide in the form of Composition 1 comprising calcium cyanamide on the 110th day to Sample 2, which corresponds to 2.16 kg composition comprising calcium cyanamide or a substance amount concentration of 11.9 mol calcium cyanamide per $m^3$ cattle liquid manure, the methane release was stopped immediately and permanently for the continuous experimental period. In the 46 days following the addition of calcium cyanamide in the form of Composition 1, only 2 mL of methane were released.

$CO_2$ Emissions:

A similar picture emerges here. After 156 days of storage, 1043 mL of $CO_2$ gas related to 1,000 kg of cattle liquid manure was released in the reference experiment (Sample 1). The development of $CO_2$ release in Sample 2 was similar to Sample 1 up to the 110th day. By adding 6.60 g calcium cyanamide in the form of Composition 1 comprising calcium cyanamide on the 110th day to Sample 2, which corresponds to 2.16 kg composition comprising calcium cyanamide or a substance amount concentration of 11.9 mol calcium cyanamide per $m^3$ cattle slurry, the $CO_2$ release was stopped immediately and permanently for the continuous experimental period. In the 46 days after the addition of calcium cyanamide in the form of Composition 1, only 3 mL of $CO_2$ were released.

SUMMARY OF THE RESULTS FROM EXAMPLES 1 TO 4

By adding 2.93 kg of calcium cyanamide in the form of Composition 1 per $m^3$ of cattle liquid manure and then bringing it into contact, the methane release is reduced by 99.7% and the $CO_2$ release by 97.9% after 156 days of storage compared with the reference test. A very similar result is obtained with an analogous procedure and storage period when adding 1.38 kg of calcium cyanamide in the form of Composition 2 per $m^3$ of cattle liquid manure. Methane release is reduced by 99.4% and $CO_2$ release by 97.1%. In contrast, the addition of 0.983 kg hydrogencyanamide solution in the form of Composition 3 per $m^3$ cattle liquid manure, which corresponds to a very similar substance concentration compared to Examples 2 and 4, reduces the methane release by only 82.9% and the $CO_2$ release by only 78.2% after 150 days of storage compared to the reference experiment. Furthermore, it is shown that by adding and bringing into contact 2.16 kg of calcium cyanamide in the form of Composition 1 per $m^3$ of cattle liquid manure at a time when the cattle liquid manure massively releases methane and $CO_2$, this release is almost stopped. Thus, from the time of addition and a period of 46 days thereafter, only 2 mL of methane and 3 mL of $CO_2$ are released per 1,000 kg of cattle liquid manure, compared to 1872 mL of methane and 372 ml of $CO_2$ per 1,000 kg of cattle liquid manure in the reference experiment.

The absolute amount of releasable gases such as methane and carbon dioxide from farm manures depends on several factors:

Type and origin of the farm manure

Retention time, temperature and oxygen supply in the form of fresh air to the farm manure in the collection channel until removal Nutrient content in animal faeces as a result of feed composition for farm animals This is evident in Examples 1 to 4. Although freshly collected farm manure of the same type and origin was used throughout these examples, the amounts of methane and carbon dioxide released varied between the references.

Example 5

Reduction of Methane and $CO_2$ Emissions from Cattle Liquid Manure 5.1 Ingredients:

Fresh cattle liquid manure (=farm manure):

From dairy cattle barn (Community Obing, Bavaria)

Without dilution by rinsing waters, cleaning waters or similar waters

Without litter

Taken from the pre-chamber of the discharge channel in the direction of the slurry pit Analyses: total nitrogen: 0.43 wt. %

Ammonium (NH$_4$): 0.17 wt. % (equivalent to 0.13% NH$_4$ nitrogen).
Nitrate nitrogen: <20 mg/kg
Dry matter: 9.87 wt. %
pH value: 7.0 (15° C.)
Conductivity: 20.1 mS/cm (15° C.)

A composition comprising calcium cyanamide (Composition 1):
Calcium cyanamide: 44.0 wt. %
Calcium nitrate: 11.1 wt. %
Calcium hydroxide: 13.4 wt. %
Calcium carbonate: 10.0 wt. %
Free carbon: 10.0 wt. %
Magnesium carbonate: 2.3 wt. %
Water: 9.2 wt. %

Fertilizer "Nitrate containing calcium cyanamide" according to A.1. Nitrogen fertilizer No. 3 (b) according to Regulation (EC) No. 2003/2003 of the European Parliament and of the Council of 13 October 2003 relating to fertilizers.

A composition comprising calcium cyanamide (Composition 2):
Calcium cyanamide: 67.7 wt. %
Calcium oxide: 13.2 wt. %
Calcium hydroxide: 3.2 wt. %
Free carbon: 13.3 wt. %
Water 2.6 wt. %

Fertilizer "Calcium cyanamide" corresponding to A.1. Nitrogen fertilizer No. 3 (a) according to Regulation (EC) No. 2003/2003 of the European Parliament and of the Council of 13 Oct. 2003 relating to fertilizers.

A composition comprising calcium cyanamide (Composition 4):
Calcium cyanamide: 97.2 wt. %
Calcium oxide: 2.3 wt. %
Calcium carbonate: 0.4 wt. %
Water: 0.1 wt. %

Composition comprising calcium hydroxide (Composition 5):
Calcium hydroxide: 99.8 wt. %
Water: 0.2 wt. %

Composition comprising calcium carbonate (Composition 6):
Calcium carbonate: 99.9 wt. %
Water: 0.1 wt. %

5.2 Experimental Procedure:

Composition 1:

In a 6 liter wide-neck container made of polyethylene (PE) with a tight-fitting lid, 3008 mL (equivalent to 2976 g) of cattle liquid manure of the described composition (cf. 5.1) were added. Subsequently, 6.55 g of Composition 1 was added (equivalent to 2.18 kg of composition comprising calcium cyanamide or 12.0 mol of calcium cyanamide per m$^3$ of cattle liquid manure), and carefully stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented CO$_2$ from the air from falsifying the measurement results. The mixture was stored for exactly 170 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.1 (22° C.)
Conductivity: 20.4 mS/cm (22° C.)

Composition 2:

In a 6 liter wide-neck container made of polyethylene (PE) with a tight-fitting lid, 2995 mL (equivalent to 2963 g) of cattle liquid manure of the described composition (cf. 5.1) were added. Subsequently, 4.15 g of Composition 2 was added (equivalent to 1.39 kg of composition comprising calcium cyanamide or 11.7 mol of calcium cyanamide per m$^3$ of cattle liquid manure), and carefully stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented CO$_2$ from the air from falsifying the measurement results. The mixture was stored for exactly 170 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.3 (22° C.)
Conductivity: 20.5 mS/cm (22° C.)

Composition 4:

In a 6 liter wide-neck container made of polyethylene (PE) with a tight-fitting lid, 3033 mL (corresponding to 3001 g) of cattle liquid manure of the described composition (cf. 5.1) were added. Subsequently, 3.00 g of Composition 4 was added (equivalent to 0.99 kg of composition comprising calcium cyanamide or 12.0 mol of calcium cyanamide per m$^3$ of cattle liquid manure), and carefully stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented CO$_2$ from the air from falsifying the measurement results. The mixture was stored for exactly 170 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.1 (22° C.)
Conductivity: 20.2 mS/cm (22° C.)

Composition 5:

In a 6 liter wide-neck container made of polyethylene (PE) with a tight-fitting lid, 3044 mL (equivalent to 3012 g) of cattle liquid manure of the described composition (cf. 5.1) were added. Subsequently, 1.51 g of Composition 5 was added (equivalent to 0.50 kg of composition comprising calcium hydroxide or 6.7 mol of calcium hydroxide per m$^3$ of cattle liquid manure), and carefully stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This structure prevented atmospheric oxygen from entering the wide-neck container. This prevented $CO_2$ from the air from falsifying the measurement results. The mixture was stored for exactly 170 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.3 (22° C.)
Conductivity: 20.2 mS/cm (22° C.)

Composition 6:

In a 6 liter wide-neck container made of polyethylene (PE) with a tight-fitting lid, 2997 mL (equivalent to 2965 g) of cattle liquid manure of the described composition (cf. 5.1) were added. Subsequently, 1.48 g of Composition 6 was added (equivalent to 0.49 kg of composition comprising calcium carbonate or 4.9 mol of calcium carbonate per m³ of cattle liquid manure), and carefully stirred in. After stirring, the pH value and conductivity in the mixture were measured, and then the wide-neck container was immediately sealed tightly. An opening was drilled in the lid of the wide-neck container, in which a sealed gas storage bag (nominal volume 5.6 liters) was connected and in which the released gas volume was collected. This design prevented atmospheric oxygen from entering the wide-neck container. This prevented $CO_2$ from the air from falsifying the measurement results. The mixture was stored for exactly 170 days without stirring or agitation at a temperature of 23±1° C. and at an air pressure of 960 to 980 hPa and at 493 m above standard sea level (NHN). At regular intervals, the filled gas storage bag was exchanged, the stored gas volume was determined volumetrically, and the gas composition was analyzed by gas chromatography.

The measured values after stirring in:
pH value: 7.1 (22° C.)
Conductivity: 20.2 mS/cm (22° C.)

5.3 Results:

The resulting gas volumes of methane and carbon dioxide are shown in the following Tables 5 to 10 (see also FIGS. 5 to 10—chart of methane and $CO_2$ emissions from Example 5). The results refer to 1,000 kg of cattle liquid manure per test variant.

TABLE 5

Gas volumes produced, based on 1,000 kg of cattle liquid manure; comparison reference with Composition 1 containing calcium cyanamide.

| Experimental period [days] | Sample 1 (reference) | | Sample 2 (Composition 1) | |
|---|---|---|---|---|
| | Methane [mL] | $CO_2$ [mL] | Methane [mL] | $CO_2$ [mL] |
| 6 | 88 [88] | 113 [113] | 7 [7] | 31 [31] |
| 32 | 13 [101] | 7 [120] | 1 [8] | 2 [33] |
| 57 | 122 [223] | 21 [141] | 2 [10] | 1 [34] |
| 71 | 471 [694] | 93 [234] | 1 [11] | 1 [35] |
| 79 | 456 [1150] | 92 [326] | 1 [12] | 1 [36] |
| 88 | 497 [1647] | 95 [421] | 1 [13] | 0 [36] |
| 97 | 665 [2312] | 94 [515] | 1 [14] | 2 [38] |
| 104 | 425 [2737] | 68 [583] | 0 [14] | 1 [39] |
| 111 | 402 [3139] | 66 [649] | 0 [14] | 0 [39] |

TABLE 5-continued

Gas volumes produced, based on 1,000 kg of cattle liquid manure; comparison reference with Composition 1 containing calcium cyanamide.

| Experimental period [days] | Sample 1 (reference) | | Sample 2 (Composition 1) | |
|---|---|---|---|---|
| | Methane [mL] | $CO_2$ [mL] | Methane [mL] | $CO_2$ [mL] |
| 118 | 433 [3572] | 62 [711] | 1 [15] | 0 [39] |
| 127 | 319 [3891] | 82 [793] | 0 [15] | 1 [40] |
| 139 | 364 [4255] | 110 [903] | 0 [15] | 0 [40] |
| 153 | 449 [4704] | 99 [1002] | 0 [15] | 0 [40] |
| 170 | 229 [4933] | 65 [1067] | 1 [16] | 1 [41] |

Figure 5:
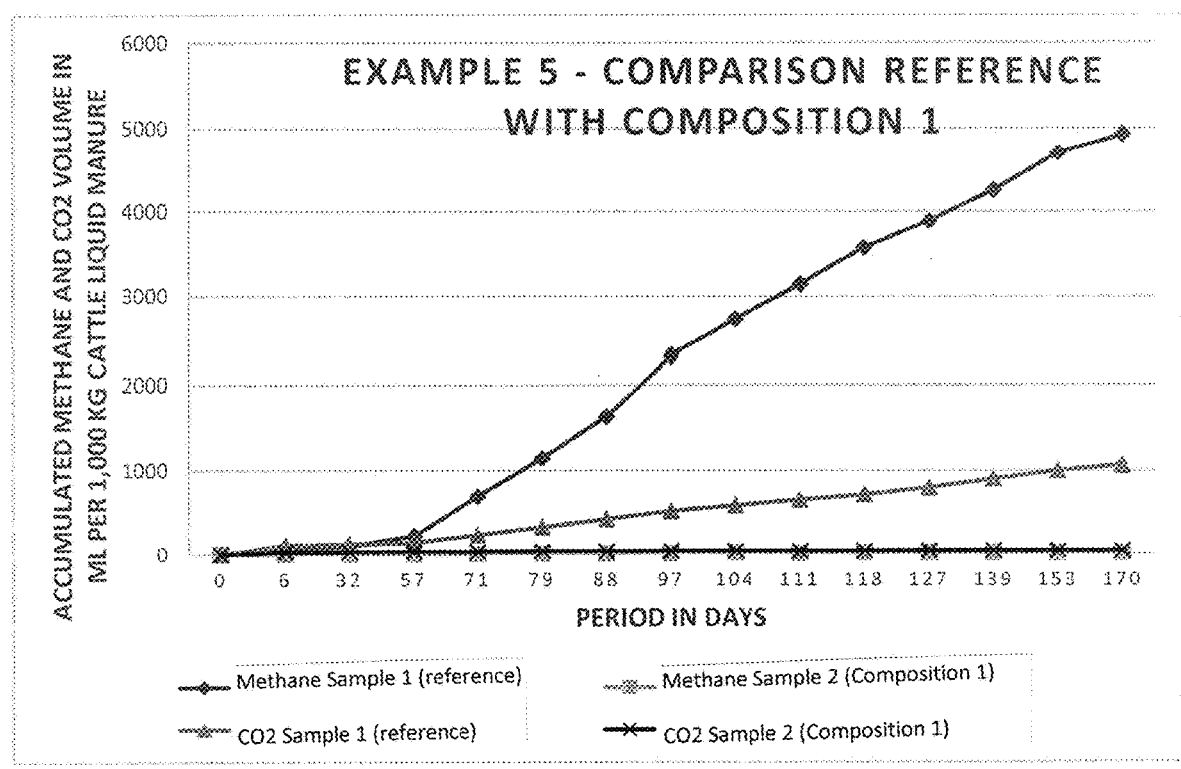
FIG. 5 shows a comparison of reference with Composition 1.

The values refer to the time period, the values in brackets are the accumulated values over the entire test period (see FIG. 5).

TABLE 6

Gas volumes produced, based on 1,000 kg of cattle liquid manure; comparison reference with Composition 2 containing calcium cyanamide.

| Experimental period [days] | Sample 1 (reference) | | Sample 2 (Composition 2) | |
|---|---|---|---|---|
| | Methane [mL] | $CO_2$ [mL] | Methane [mL] | $CO_2$ [mL] |
| 6 | 88 [88] | 113 [113] | 4 [4] | 22 [22] |
| 32 | 13 [101] | 7 [120] | 2 [6] | 1 [23] |
| 57 | 122 [223] | 21 [141] | 1 [7] | 1 [24] |
| 71 | 471 [694] | 93 [234] | 1 [8] | 1 [25] |
| 79 | 456 [1150] | 92 [326] | 0 [8] | 1 [26] |
| 88 | 497 [1647] | 95 [421] | 1 [9] | 0 [26] |
| 97 | 665 [2312] | 94 [515] | 1 [10] | 1 [27] |
| 104 | 425 [2737] | 68 [583] | 0 [10] | 0 [27] |
| 111 | 402 [3139] | 66 [649] | 0 [10] | 0 [27] |
| 118 | 433 [3572] | 62 [711] | 0 [10] | 1 [28] |
| 127 | 319 [3891] | 82 [793] | 0 [10] | 0 [28] |
| 139 | 364 [4255] | 110 [903] | 0 [10] | 0 [28] |
| 153 | 449 [4704] | 99 [1002] | 0 [10] | 1 [29] |
| 170 | 229 [4933] | 65 [1067] | 1 [11] | 1 [30] |

Figure 6:
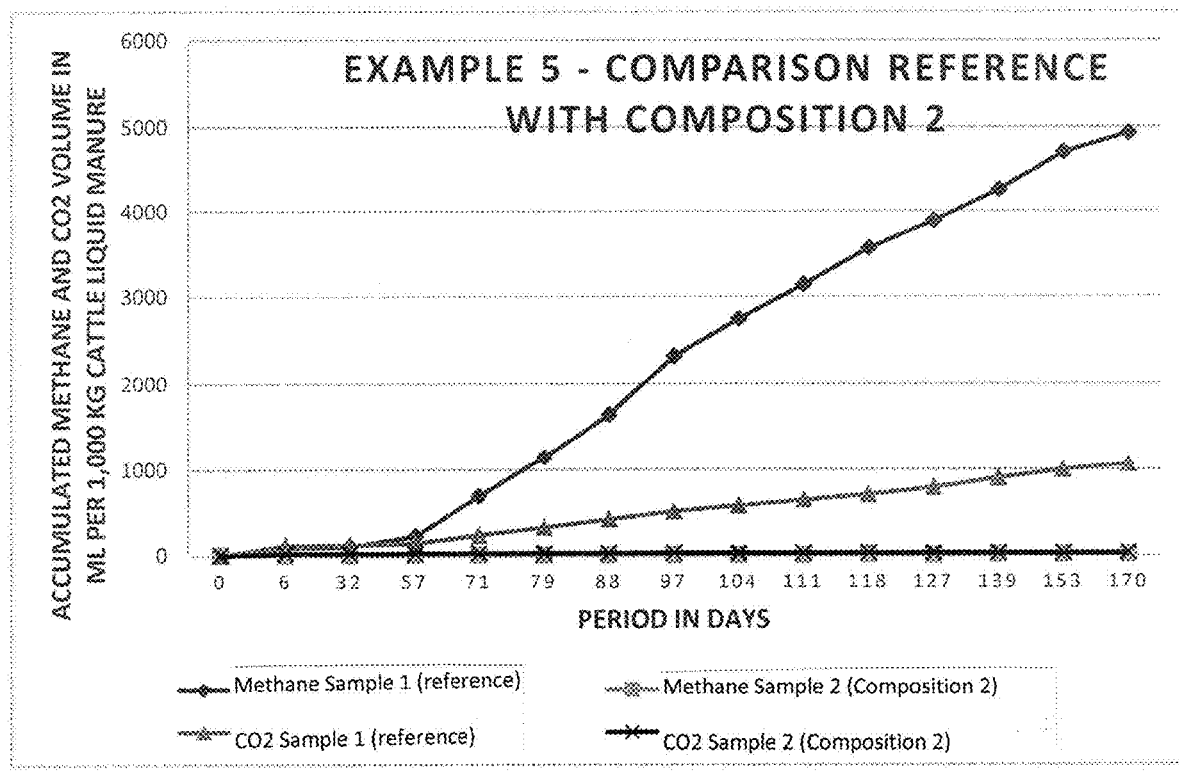
FIG. 6 shows a comparison of reference with Composition 2.

The values refer to the time period, the values in brackets are the accumulated values over the entire test period (see FIG. 6).

TABLE 7

Gas volumes produced, based on 1,000 kg of cattle liquid manure; comparison reference with Composition 4 containing calcium cyanamide.

| Experimental period [days] | Sample 1 (reference) | | Sample 2 (Composition 4) | |
|---|---|---|---|---|
| | Methane [mL] | $CO_2$ [mL] | Methane [mL] | $CO_2$ [mL] |
| 6 | 88 [88] | 113 [113] | 46 [46] | 60 [60] |
| 32 | 13 [101] | 7 [120] | 3 [49] | 3 [63] |
| 57 | 122 [223] | 21 [141] | 4 [53] | 2 [65] |
| 71 | 471 [694] | 93 [234] | 4 [57] | 2 [67] |
| 79 | 456 [1150] | 92 [326] | 2 [59] | 1 [68] |
| 88 | 497 [1647] | 95 [421] | 1 [60] | 0 [68] |
| 97 | 665 [2312] | 94 [515] | 7 [67] | 2 [70] |
| 104 | 425 [2737] | 68 [583] | 18 [85] | 3 [73] |
| 111 | 402 [3139] | 66 [649] | 68 [153] | 8 [81] |
| 118 | 433 [3572] | 62 [711] | 97 [250] | 13 [94] |
| 127 | 319 [3891] | 82 [793] | 177 [427] | 18 [112] |

TABLE 7-continued

Gas volumes produced, based on 1,000 kg of cattle liquid manure; comparison reference with Composition 4 containing calcium cyanamide.

| Experimental period [days] | Sample 1 (reference) Methane [mL] | CO$_2$ [mL] | Sample 2 (Composition 4) Methane [mL] | CO$_2$ [mL] |
|---|---|---|---|---|
| 139 | 364 [4255] | 110 [903] | 295 [722] | 24 [136] |
| 153 | 449 [4704] | 99 [1002] | 564 [1286] | 47 [183] |
| 170 | 229 [4933] | 65 [1067] | 1025 [2311] | 66 [249] |

Figure 7:
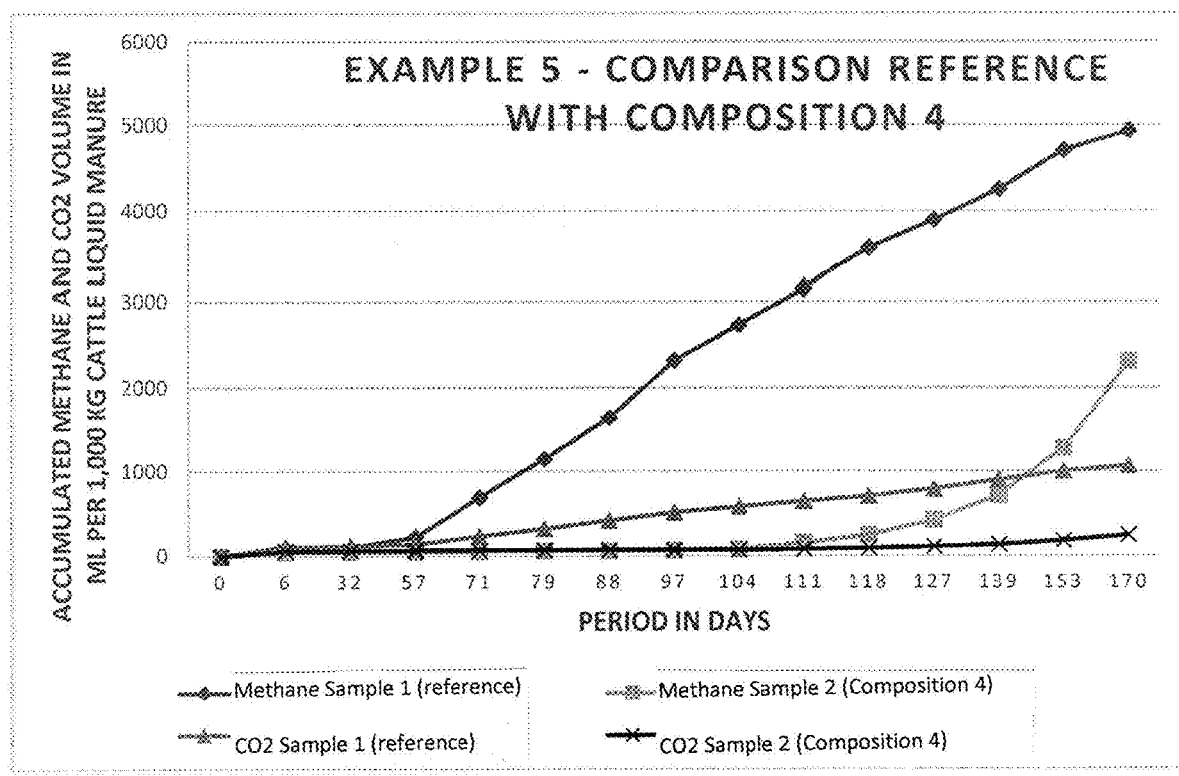
FIG. 7 shows a comparison of reference with Composition 4.

The values refer to the time period, the values in brackets are the accumulated values over the entire test period (see FIG. 7).

TABLE 8

Gas volumes produced, based on 1,000 kg cattle liquid manure; comparison reference with Composition 5 containing calcium hydroxide.

| Experimental period [days] | Sample 1 (reference) Methane [mL] | CO$_2$ [mL] | Sample 2 (Composition 5) Methane [mL] | CO$_2$ [mL] |
|---|---|---|---|---|
| 6 | 88 [88] | 113 [113] | 125 [125] | 138 [138] |
| 32 | 13 [101] | 7 [120] | 39 [164] | 15 [153] |
| 57 | 122 [223] | 21 [141] | 124 [288] | 21 [174] |
| 71 | 471 [694] | 93 [234] | 709 [997] | 136 [310] |
| 79 | 456 [1150] | 92 [326] | 534 [1531] | 121 [431] |
| 88 | 497 [1647] | 95 [421] | 654 [2185] | 149 [580] |
| 97 | 665 [2312] | 94 [515] | 878 [3063] | 136 [716] |
| 104 | 425 [2737] | 68 [583] | 796 [3859] | 108 [824] |
| 111 | 402 [3139] | 66 [649] | 623 [4482] | 108 [932] |
| 118 | 433 [3572] | 62 [711] | 502 [4984] | 85 [1017] |
| 127 | 319 [3891] | 82 [793] | 411 [5395] | 89 [1106] |
| 139 | 364 [4255] | 110 [903] | 573 [5968] | 89 [1195] |
| 153 | 449 [4704] | 99 [1002] | 516 [6484] | 84 [1279] |
| 170 | 229 [4933] | 65 [1067] | 307 [6791] | 82 [1361] |

Figure 8:
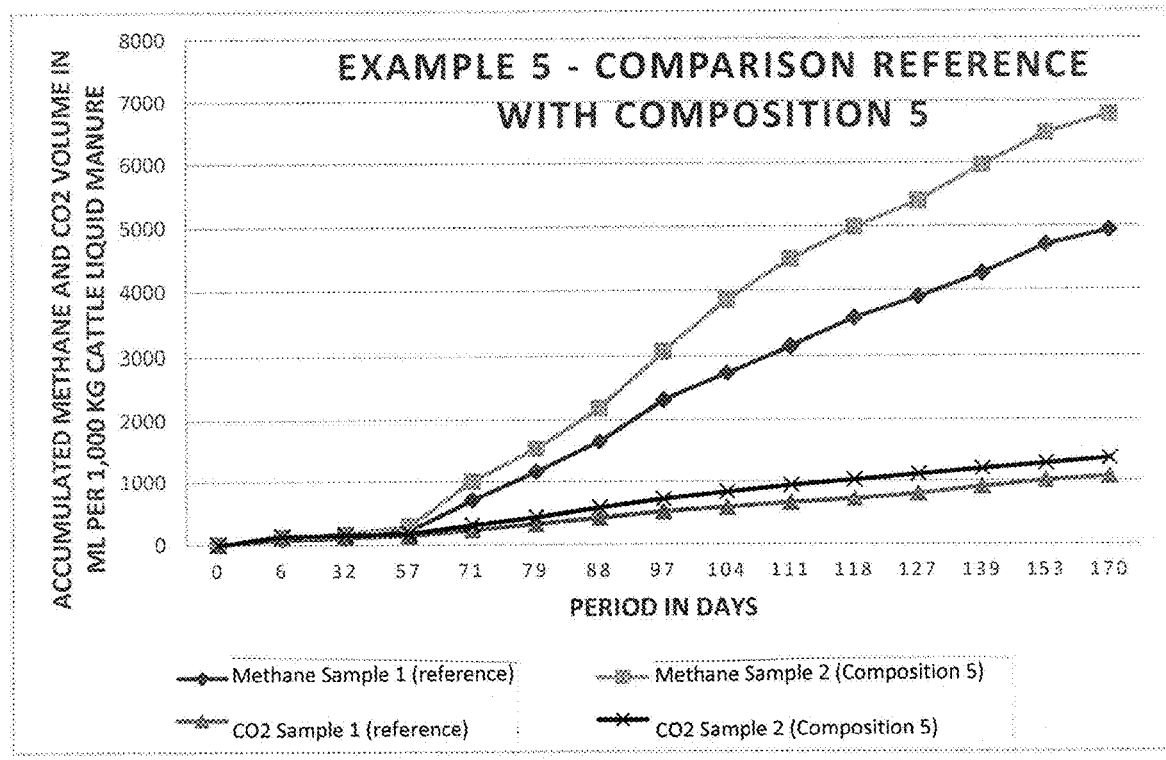
FIG. 8 shows a comparison of reference with Composition 5.

The values refer to the time period, the values in brackets are the accumulated values over the entire test period (see FIG. 8).

TABLE 9

Gas volumes produced, based on 1,000 kg cattle liquid manure; comparison reference with Composition 6 containing calcium carbonate.

| Experimental period [days] | Sample 1 (reference) Methane [mL] | CO$_2$ [mL] | Sample 2 (Composition 6) Methane [mL] | CO$_2$ [mL] |
|---|---|---|---|---|
| 6 | 88 [88] | 113 [113] | 64 [64] | 35 [35] |
| 32 | 13 [101] | 7 [120] | 13 [77] | 4 [39] |
| 57 | 122 [223] | 21 [141] | 112 [189] | 12 [51] |
| 71 | 471 [694] | 93 [234] | 356 [545] | 46 [97] |
| 79 | 456 [1150] | 92 [326] | 447 [992] | 75 [172] |
| 88 | 497 [1647] | 95 [421] | 409 [1401] | 77 [249] |
| 97 | 665 [2312] | 94 [515] | 555 [1956] | 78 [327] |
| 104 | 425 [2737] | 68 [583] | 393 [2349] | 71 [398] |
| 111 | 402 [3139] | 66 [649] | 488 [2837] | 75 [473] |
| 118 | 433 [3572] | 62 [711] | 413 [3250] | 71 [544] |
| 127 | 319 [3891] | 82 [793] | 348 [3598] | 86 [630] |
| 139 | 364 [4255] | 110 [903] | 337 [3935] | 108 [738] |
| 153 | 449 [4704] | 99 [1002] | 477 [4412] | 97 [835] |
| 170 | 229 [4933] | 65 [1067] | 201 [4613] | 67 [902] |

Figure 9:
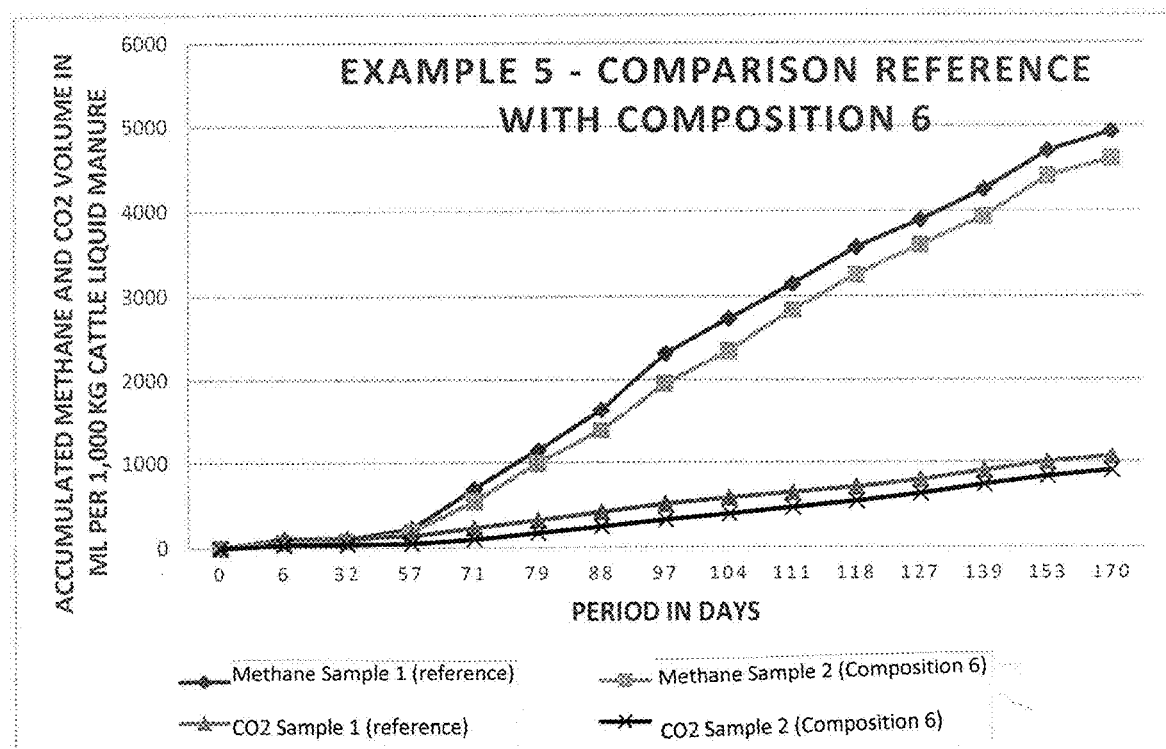
FIG. 9 shows a comparison of reference with Composition 6.

The values refer to the time period, the values in brackets are the accumulated values over the entire test period (see FIG. 9).

5.4 Summary of Results:

Methane Emissions:

After 170 days of storage, 4933 mL of methane gas related to 1,000 kg of cattle liquid manure was released in the reference experiment (Sample 1).

By adding 6.55 g of calcium cyanamide in the form of Composition 1 comprising calcium cyanamide, which corresponds to 2.18 kg of Composition 1 comprising calcium cyanamide or a substance amount concentration of 12.0 mol calcium cyanamide per m$^3$ cattle liquid manure, these emissions can be reduced by 99.7% to 16 mL methane gas.

By adding 4.15 g calcium cyanamide in the form of Composition 2 comprising calcium cyanamide, which corresponds to 1.39 kg composition comprising calcium cyanamide or a substance amount concentration of 11.7 mol calcium cyanamide per m$^3$ cattle liquid manure, these emissions can be reduced by 99.8% to 11 mL methane gas.

By adding 3.00 g calcium cyanamide in the form of Composition 4 comprising calcium cyanamide, which corresponds to 0.99 kg composition comprising calcium cyanamide or a substance amount concentration of 12.0 mol calcium cyanamide per m$^3$ cattle liquid manure, these emissions can be reduced by 53.2% to 2311 mL methane gas. Whereby after 97 days of storage, only 67 mL of methane was released, corresponding to a methane gas reduction of 2245 mL or 97.1% at this point. The majority of the methane gas was released during the subsequent storage period.

Addition of 1.51 g of calcium hydroxide in the form of Composition 5 comprising calcium hydroxide, which corresponds to 0.50 kg of Composition comprising calcium hydroxide or a molar concentration of 6.7 mol of calcium hydroxide per m$^3$ of cattle liquid manure, increases emissions by 37.7% to 6791 mL of methane gas.

By adding 1.48 g calcium carbonate in the form of Composition 6 comprising calcium carbonate, which corresponds to 0.49 kg composition comprising calcium carbonate or a substance amount concentration of 4.9 mol calcium carbonate per m$^3$ cattle liquid manure, these emissions can be reduced by 6.5% to 4613 mL methane gas.

CO$_2$ Emissions:

A similar picture emerges here. After 170 days of storage, 1067 mL of CO$_2$ gas related to 1,000 kg of cattle liquid manure were released in the reference experiment (Sample 1).

By adding 6.55 g of calcium cyanamide in the form of Composition 1 comprising calcium cyanamide, which corresponds to 2.18 kg of Composition comprising calcium cyanamide or a substance amount concentration of 12.0 mol calcium cyanamide per m$^3$ cattle liquid manure, these emissions can be reduced by 96.2% to 41 mL CO$_2$ gas By adding 4.15 g calcium cyanamide in the form of Composition 2 comprising calcium cyanamide, which corresponds to 1.39 kg composition comprising calcium cyanamide or a substance amount concentration of 11.7 mol calcium cyanamide per m$^3$ cattle liquid manure, these emissions can be reduced by 97.2% to 30 mL CO$_2$ gas.

By adding 3.00 g calcium cyanamide in the form of Composition 4 comprising calcium cyanamide, which corresponds to 0.99 kg composition comprising calcium cyanamide or a substance amount concentration of 12.0 mol calcium cyanamide per m$^3$ cattle liquid manure, these emissions can be reduced by 76.7% to 249 mL $CO_2$ gas.

Addition of 1.51 g of calcium hydroxide in the form of Composition 5 comprising calcium hydroxide, which corresponds to 0.50 kg of Composition comprising calcium hydroxide or a molar concentration of 6.7 mol of calcium hydroxide per m$^3$ of cattle liquid manure, increases emissions by 27.6% to 1361 mL of $CO_2$ gas.

By adding 1.48 g calcium carbonate in the form of Composition 6 comprising calcium carbonate, which corresponds to 0.49 kg composition comprising calcium carbonate or a substance amount concentration of 4.9 mol calcium carbonate per m$^3$ cattle liquid manure, these emissions can be reduced by 15.5% to 902 mL $CO_2$ gas.

SUMMARY OF THE RESULTS FROM EXAMPLES 1 TO 5

The absolute amount of releasable gases such as methane and carbon dioxide from farm manures depends on several factors:
Type and origin of the farm manure
Retention time, temperature and oxygen supply in the form of fresh air to the farm manure in the collection channel until removal
Nutrient content in animal faeces as a result of feed composition for farm animals.

This is evident in Examples 1 to 5. Although freshly collected farm manure of the same type and origin was used throughout these examples, the amounts of methane and carbon dioxide released varied between references.

By adding 2.93 kg of calcium cyanamide in the form of Composition 1 per m$^3$ of cattle liquid manure and then bringing it into contact in Example 1, the methane release is reduced by 99.7% and the $CO_2$ release by 97.9% after 156 days of storage compared with the reference experiment. A very similar result is obtained with an analogous procedure and storage period when adding 1.38 kg of calcium cyanamide in the form of Composition 2 per m$^3$ of cattle liquid manure in Example 2. The methane release is reduced by 99.4% and the $CO_2$ release by 97.1%.

These results are confirmed in Example 5 even with longer storage time. By adding 2.18 kg of calcium cyanamide in the form of Composition 1 per m$^3$ of cattle liquid manure and then bringing it into contact, the methane release is reduced by 99.7% and the $CO_2$ release by 96.2% after 170 days of storage compared with the reference test. By adding 1.39 kg of calcium cyanamide in the form of Composition 2 per m$^3$ of cattle liquid manure and then bringing it into contact, the methane release is reduced by 99.8% and the $CO_2$ release by 97.2% after 170 days of storage.

In contrast, the addition of 0.983 kg of hydrogencyanamide solution in the form of Composition 3 per m$^3$ of cattle liquid manure, which corresponds to a very similar substance amount concentration compared to Examples 2, 4 and 5, reduces methane release by only 82.9% and $CO_2$ release by only 78.2% after 150 days of storage compared to the reference experiment.

Furthermore, it is shown that by adding and bringing into contact 2.16 kg of calcium cyanamide in the form of Composition 1 per m$^3$ of cattle liquid manure at a time when the cattle liquid manure is massively releasing methane and $CO_2$, this release is almost stopped. Thus, from the time of addition and a period of 46 days thereafter, only 2 mL of methane and 3 mL of $CO_2$ are released per 1,000 kg of cattle liquid manure, compared to 1872 mL of methane and 372 ml of $CO_2$ per 1,000 kg of cattle liquid manure in the reference experiment.

However, the addition of 0.99 kg of calcium cyanamide in the form of Composition 4, which has a low proportion of calcium oxide (2.3 wt. %) and calcium carbonate (0.4 wt. %), per m$^3$ of cattle liquid manure and subsequent contacting shows a significantly shorter period of reduced methane and $CO_2$ release, although the added substance amount concentration of calcium cyanamide was the same as for Compositions 1 and 2 in Example 5.

Similarly, Example 5 shows that an addition followed by contacting of 0.50 kg of calcium hydroxide in the form of Composition 5 per m$^3$ of cattle liquid manure actually increases the release of methane and $CO_2$ after 170 days of storage compared with the reference experiment. The addition of 0.49 kg of calcium carbonate in the form of Composition 6 per m$^3$ of cattle liquid manure under analogous execution, on the other hand, reduces the release of methane and $CO_2$ only to a small extent. All the more surprising is the effective reduction in methane and $CO_2$ release, lasting 156 days and 170 days respectively, by the addition of Compositions 1 or 2, which has a combination of calcium cyanamide and calcium oxide/calcium hydroxide and/or calcium carbonate.

The released gas volumes of the reference experiments from Examples 1 to 5 show that after 150 to 170 days of storage of cattle liquid manure, 4.2 to 5.9 times more volume of methane is released than of $CO_2$. Considering the molar volume ($V_m$), 1.5 to 2.1 times more mass of methane is released than of $CO_2$. Methane has a global warming potential (GWP) of 28 according to IPCC AR5 based on 100 years. This means that within the first 100 years after release, one kilogram of methane contributes 28 times as much to the greenhouse effect as one kilogram of $CO_2$ (source: Wikipedia). Thus, according to the present invention, a significant contribution is made to reducing greenhouse gas emissions without significantly increasing the nitrogen content in farm manure.

The invention claimed is:

1. A process for reducing the emission of methane and/or carbon dioxide from farm manure selected from liquid manure, dung slurry or biogas fermentation residues during its storage, comprising the process steps of:
  a) providing a storage tank for the farm manure with a volume X, and
  b) filling the storage tank with the farm manure in an amount equal to at least 5 vol. % of the volume X of the storage tank; and
  c) adding a composition comprising from 10 to 100 wt. % of calcium cyanamide to the storage tank and bringing the composition into contact with the farm manure, wherein the composition is added to the farm manure in an amount of from 0.5 to 8 kg per 1 m$^3$ of farm manure.

2. The process according to claim 1, wherein the addition of the composition takes place before, during or after the first filling with farm manure.

3. The process according to claim 1, wherein the addition of the composition:
  i) takes place once after or during the first addition of a first partial amount of farm manure to the storage tank, or ii) takes place in portions after each partial filling of the storage tank, or iii) takes place once after or during the complete filling of the storage tank with farm manure.

4. The process according to claim 1, wherein the storage tank for the farm manure is an open storage tank or a closed storage tank.

5. The process according to claim 1, wherein the storage temperature of the farm manure is from 0 to 60° C.

6. The process according to claim 1, wherein the composition comprises from 10 to 100 wt. % of calcium cyanamide.

7. The process according to claim 1, wherein the composition is added to the farm manure as a solid or as a suspension.

8. The process according to claim 1, wherein the composition is added to the farm manure in an amount of 1 to 5 kg per 1 m³ of farm manure.

9. The process according to claim 1, wherein adding a composition comprising calcium cyanamide is stopping or inhibiting anaerobic fermentation of the farm manure or is inhibiting microbial degradation of organic substrates in the farm manure.

10. The process according to claim 1 wherein the composition comprises:
  a) 25 to 95 wt. % calcium cyanamide,
  b) 5 to 40 wt. % of at least one compound selected from the group consisting of magnesium carbonate, magnesium hydrogen carbonate, magnesium oxide, magnesium hydroxide, calcium carbonate, calcium hydrogen carbonate, calcium oxide and calcium hydroxide, or mixtures thereof,
  c) up to 20 wt. % of at least one nitrate selected from the group consisting of sodium nitrate, potassium nitrate, magnesium nitrate and calcium nitrate, or mixtures thereof,
  d) up to 15 wt. % free carbon, charcoal or graphite, and
  e) up to 10 wt. % water.

11. The process according to claim 1 wherein the composition comprises:
  a) 50 to 80 wt. % calcium cyanamide,
  b) 5 to 25 wt. % of at least one compound selected from the group consisting of magnesium carbonate, magnesium hydrogen carbonate, magnesium oxide, magnesium hydroxide, calcium carbonate, calcium hydrogen carbonate, calcium oxide and calcium hydroxide, or mixtures thereof,
  c) 1 to 15 wt. % free carbon, charcoal or graphite, and
  d) up to 10 wt. % water.

12. The process according to claim 1 wherein the composition comprises:
  a) 35 to 55 wt. % calcium cyanamide,
  b) 15 to 35 wt. % of at least one compound selected from the group consisting of magnesium carbonate, magnesium hydrogen carbonate, magnesium oxide, magnesium hydroxide, calcium carbonate, calcium hydrogen carbonate, calcium oxide and calcium hydroxide, or mixtures thereof,
  c) 1 to 20 wt. % of at least one nitrate selected from the group consisting of sodium nitrate, potassium nitrate, magnesium nitrate and calcium nitrate, or mixtures thereof,
  d) 1 to 15 wt. % free carbon, charcoal or graphite, and
  e) up to 10 wt. % water.

\* \* \* \* \*